(12) United States Patent
Tomioka et al.

(10) Patent No.: US 11,713,977 B2
(45) Date of Patent: Aug. 1, 2023

(54) INFORMATION PROCESSING APPARATUS, INFORMATION PROCESSING METHOD, AND MEDIUM

(71) Applicant: CANON KABUSHIKI KAISHA, Tokyo (JP)

(72) Inventors: Makoto Tomioka, Kanagawa (JP); Masakazu Fujiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 17/118,040

(22) Filed: Dec. 10, 2020

(65) Prior Publication Data
US 2021/0190535 A1    Jun. 24, 2021

(30) Foreign Application Priority Data

Dec. 19, 2019   (JP) ................................. 2019-229709
Dec. 19, 2019   (JP) ................................. 2019-229710

(51) Int. Cl.
*G01C 21/00*     (2006.01)
*G05D 1/02*      (2020.01)

(52) U.S. Cl.
CPC ..... *G01C 21/3822* (2020.08); *G01C 21/3848* (2020.08); *G05D 1/0246* (2013.01); *G05D 1/0274* (2013.01)

(58) Field of Classification Search
CPC ............ G01C 21/3822; G01C 21/3848; G05D 1/0246; G05D 1/0274
See application file for complete search history.

(56) References Cited

U.S. PATENT DOCUMENTS

| | | | |
|---|---|---|---|
| 7,444,238 B1* | 10/2008 | Opitz | G01C 21/28 701/454 |
| 11,199,853 B1* | 12/2021 | Afrouzi | G05D 1/0246 |
| 2016/0271795 A1* | 9/2016 | Vicenti | G05D 1/0274 |
| 2016/0349754 A1* | 12/2016 | Mohr | G05D 1/0274 |
| 2017/0122749 A1* | 5/2017 | Urano | G01S 19/42 |
| 2017/0157769 A1* | 6/2017 | Aghamohammadi | B25J 9/1664 |

(Continued)

FOREIGN PATENT DOCUMENTS

JP          5444952 B2     3/2014

*Primary Examiner* — Hunter B Lonsberry
*Assistant Examiner* — Harrison Heflin
(74) *Attorney, Agent, or Firm* — Canon U.S.A., Inc., I.P. Division

(57) ABSTRACT

An information processing apparatus includes an update unit and an obtaining unit. The obtaining unit obtains a second position of a map feature point included in map information based on the map information and information obtained from a vehicle sensor. The map information includes a map feature point first position measured in an environment including a closed route along which the vehicle travels. The sensor-obtained information includes a sensor feature point measured by the sensor mounted on the vehicle while the vehicle travels along the closed route. Where a distance between an estimated vehicle first position and an estimated vehicle second position is greater than a threshold, map information updating is restrained. Where the vehicle traveling near the vehicle first position continues traveling along the closed route, the update unit updates the map information between when the vehicle leaves the vehicle first position and nears the vehicle second position.

15 Claims, 11 Drawing Sheets

(56) References Cited

U.S. PATENT DOCUMENTS

| | | | | |
|---|---|---|---|---|
| 2018/0246524 A1* | 8/2018 | Hillen | ................... | B25J 9/1664 |
| 2019/0257659 A1* | 8/2019 | Moteki | ..................... | G06T 1/00 |
| 2019/0300053 A1* | 10/2019 | Mizoguchi | ...... | B60W 30/18163 |
| 2021/0063201 A1* | 3/2021 | Steder | ................... | G01S 13/876 |
| 2021/0180987 A1* | 6/2021 | Terada | ..................... | G08G 1/20 |

\* cited by examiner

WHEN POSITIONS OF FEATURE POINTS ARE UPDATED BECAUSE OF INCREASE OF OBSERVATION POINTS OF VIEW

○ FEATURE POINT BEFORE UPDATE
● FEATURE POINT AFTER UPDATE

BEFORE MAP UPDATE

AFTER MAP UPDATE

WHEN POSITIONS OF FEATURE POINTS ARE UPDATED BY LOOP CLOSURE DETECTION

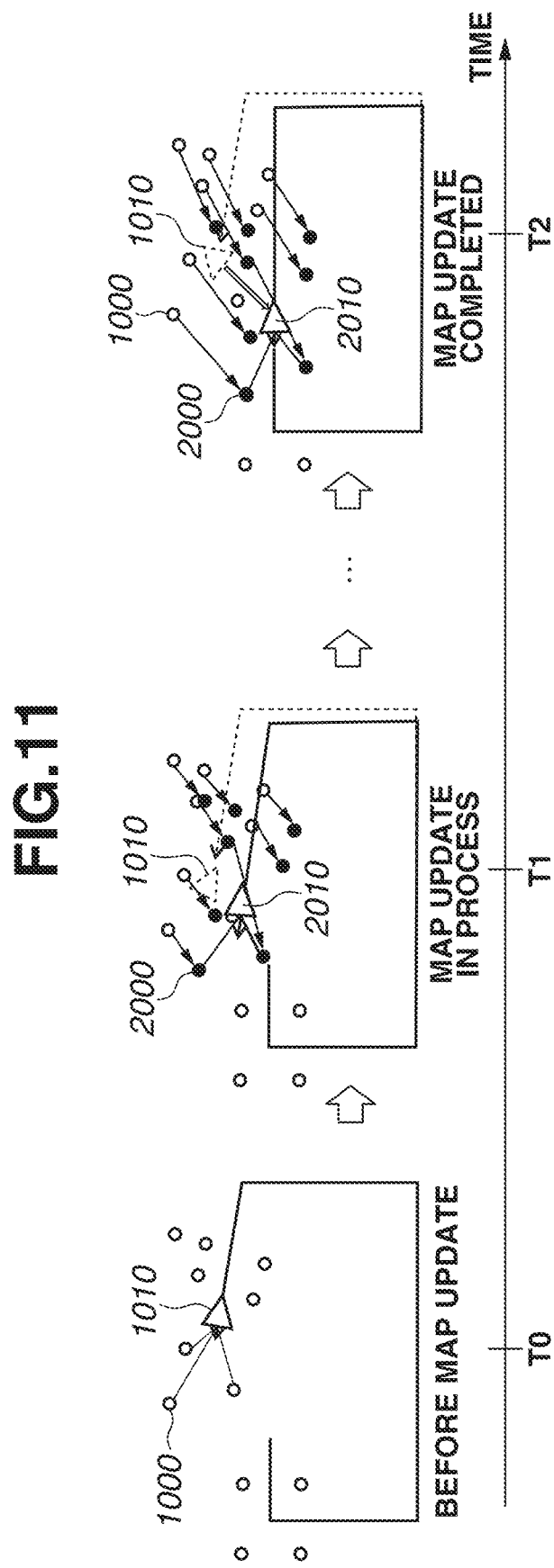

INFORMATION PROCESSING APPARATUS, INFORMATION PROCESSING METHOD, AND MEDIUM

BACKGROUND OF THE INVENTION

Field of the Invention

The present disclosure relates to a technique for updating map information based on an image.

Description of the Related Art

There has heretofore been a technique for generating a map for calculating a position and orientation of a sensor, which is mounted on a vehicle that autonomously travels, by using the sensor, calculating the position and orientation of the sensor by referring to the generated map, and controlling the vehicle. The technique includes updating the map based on sensor values at a plurality of times to improve accuracy of the map, and making additions (updates) to the map at any time based on a time series of sensor values to calculate the position and orientation in a region where the map is not generated. Japanese Patent No. 5444952 discusses a method for automatically generating and updating a map while a vehicle is moving autonomously.

SUMMARY OF THE INVENTION

According to an aspect of the present disclosure, an information processing apparatus includes an obtaining unit configured to obtain a second position of a map feature point included in map information based on the map information and information obtained from a sensor mounted on a vehicle, wherein, in advance of obtaining the second position of the map feature point, the map information includes a first position of the map feature point measured in an environment including a closed route for the vehicle to travel along, and wherein the sensor-obtained information includes a sensor feature point measured by the sensor mounted on the vehicle while the vehicle travels along the closed route, and an update unit configured to update the map information, wherein, in a case where a distance between a first position of the vehicle estimated from the measured first position of the map feature point and a second position of the vehicle estimated based on the obtained second position of the map feature point is greater than a threshold, the update unit restrains an update of the map information, and wherein, in a case where the vehicle traveling near the vehicle first position continues traveling along the closed route, the update unit updates the map information between when the vehicle gets a predetermined distance or more away from near the vehicle first position and when the vehicle returns to a predetermined distance or less away from the vehicle second position.

Further features of the present disclosure will become apparent from the following description of exemplary embodiments with reference to the attached drawings.

BRIEF DESCRIPTION OF THE DRAWINGS

FIG. 11 is a diagram illustrating an example of timing when the map is updated.

DESCRIPTION OF THE EMBODIMENTS

Figure 1:
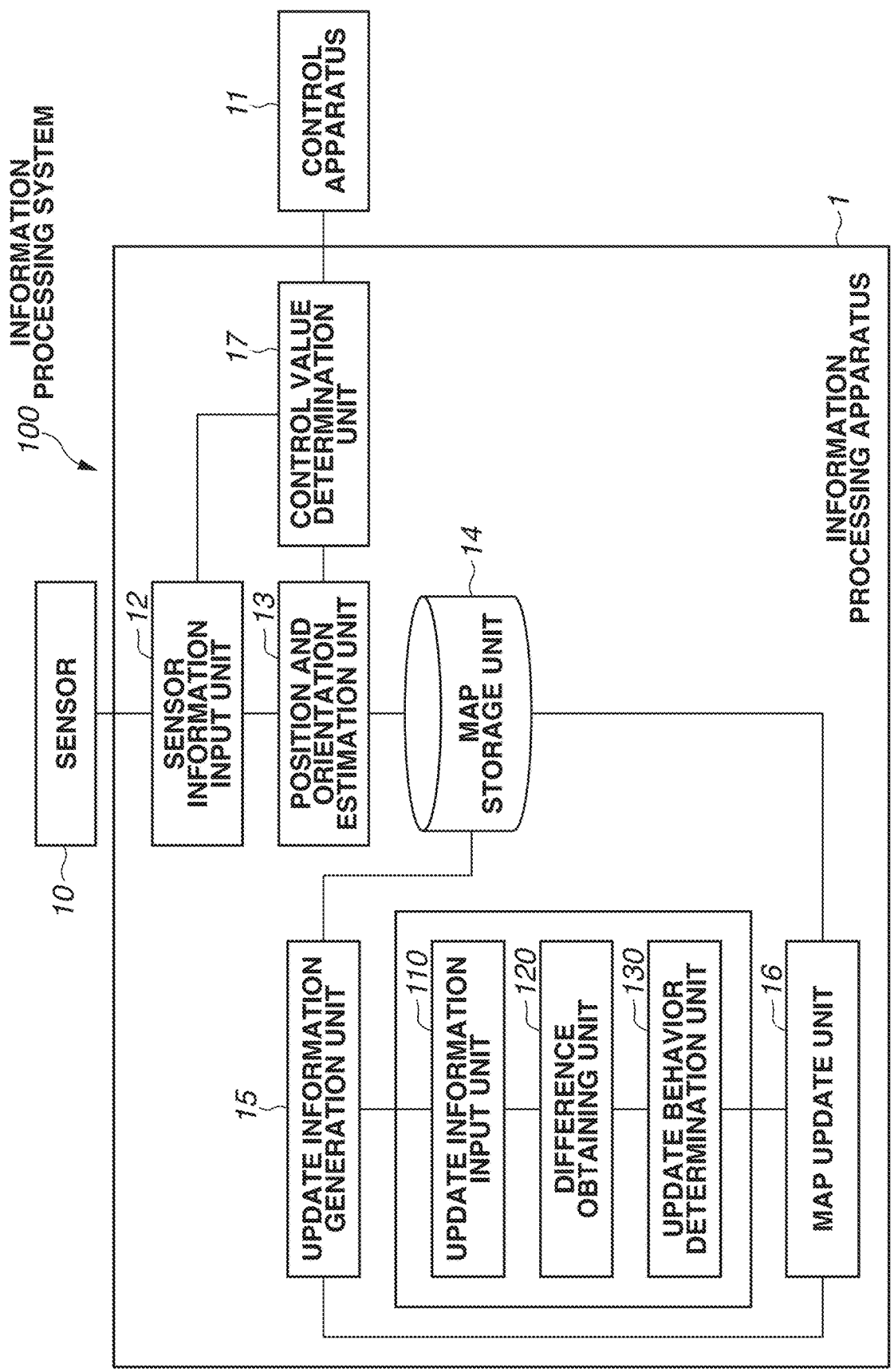
FIG. 1 is a block diagram illustrating a functional configuration example of an information processing apparatus.

Hereinafter, embodiments will be described in detail with reference to the attached drawings. Note, the following embodiments are not intended to limit the scope of the disclosure. Multiple features are described in the embodiments, but limitation is not made that requires all such features, and multiple such features may be combined as appropriate. Furthermore, in the attached drawings, the same reference numerals are given to the same or similar configurations, and redundant description thereof is omitted.

According to the technique discussed in Japanese Patent No. 5444952, the map is updated each time information about a new position of a feature point is input, for example. Thus, an estimation result of the position and orientation of the sensor or vehicle changes based on the updated map. In particular, if a change between the original estimation result of the position and orientation of the vehicle and the updated estimation result thereof is large, the moving speed and/or direction of the vehicle can change abruptly.

A first exemplary embodiment of the present disclosure can reduce abrupt changes occurring in the estimation result of the position and orientation of an object estimating its position by using map information when the map information is updated.

The present exemplary embodiment deals with a case where an information processing apparatus 1 according to the present exemplary embodiment is applied to an information processing system 100. An example of the information processing system 100 is a system including a vehicle, a sensor (measurement apparatus), and the information processing apparatus 1. The position and orientation of the sensor, which is mounted on the vehicle, are calculated based on sensor information measured by the sensor. Control values for moving the vehicle to a destination are calculated based on the calculated position and orientation. A control apparatus 11 moves the vehicle to the destination based on the control values. The system configuration is not limited thereto. For example, the information processing system 100 may include a server that generates control values, a vehicle that can communicate with the server, and an external sensor that observes the vehicle.

In the present exemplary embodiment, the position and orientation of the sensor are measured by using a simultaneous localization and mapping (SLAM) technique that is a technique for calculating the position and orientation while generating and updating a map based on sensor information. With the SLAM technique, generating and updating the map changes map elements used for position and orientation estimation. Thus, the estimation result of the calculated position and orientation of the vehicle changes before and after a map update. This change can cause an abrupt change in the speed and/or direction of the vehicle.

Examples of such a case will be described with reference to FIGS. 10A to 10D. In a first example (see FIGS. 10A and 10B), the positions of feature points are updated because of an increase of observation points of view. For example, as the vehicle (camera) moves, the same feature points are observed from a plurality of points of view. This improves the depth accuracy of motion stereo, and the three-dimensional positions of the feature points can be more accurately calculated. If the map is rewritten with the calculated positions of the feature points as update values, the positions of the feature points used for position and orientation estimation change (from white points 1000 to black points 2000), and the estimation result of the position and orientation of the camera change from an estimation result 1010 to an estimation result 2010. In a second example (see FIGS. 10C and 10D), the positions of feature points are updated by loop closure detection. The loop closure detection refers to processing for matching an initially estimated start point with the estimated position of the start point upon returning when, for example, the vehicle has gone through a circulating travelling environment and returned to the start point. Whether the two points are the same is determined by comparing an image initially captured at the start point with one captured when the vehicle has returned to the same point as the start point or near the start point. If the degree of similarity between image features is higher than a predetermined value, the two points are determined to be the same. If the two points are determined to be the same, the three-dimensional positions of the map (feature points) are recalculated so that global coordinates of the feature points included in images captured at the same point coincide. This changes the three-dimensional positions of the feature points used for position and orientation estimation, and changes the estimation result of the position and orientation of the camera. Examples of cases where loop closure processing is necessary or where the feature points used for position and orientation estimation increase or decrease or the positions of the feature points change include: a case where position estimation errors of the feature points exceed a predetermined threshold or such errors accumulate, and where the environment changes. In the former case, an impact of the errors varies greatly depending on measurement accuracy of the sensor and performance of the apparatus that performs the estimation processing. In the latter case, examples of the environmental change include a change in the layout of the traveling environment, variations due to human or object movement, and a change in lighting conditions. Occurrence of such environmental changes can increase or decrease feature points in the map prepared in advance or move the initially observed feature points. Therefore, self-position and orientation estimation is desirably performed along with a map update.

In the present exemplary embodiment, whether the vehicle is located within a predetermined range from a region where an amount of change in the calculated position and orientation of a sensor 10 due to a map update is large, or equivalently, from an update region where elements are rewritten due to a map update is determined. For example, feature points of which the coordinates are rewritten are extracted, and a convex hull area surrounding the feature points is assumed as an update region. If the vehicle is located outside the predetermined range from the update region, the map is updated. The reason is that traveling of the vehicle is less likely to be affected by a map update if a distance between the update region of the map and the position of the vehicle is large.

As illustrated in FIG. 1, the information processing system 100 according to the present exemplary embodiment includes the sensor 10, the information processing apparatus 1, and a control apparatus 11. The information processing apparatus 1 includes an update information input unit 110, a difference obtaining unit 120, and an update behavior determination unit 130. The information processing apparatus 1 according to the present exemplary embodiment further includes a sensor information input unit 12, a position and orientation estimation unit 13, a map storage unit 14, an update information generation unit 15, a map update unit 16, and a control value determination unit 17. The sensor information input unit 12, the position and orientation estimation unit 13, the map storage unit 14, the update information generation unit 15, the map update unit 16, and the control value determination unit 17 may be included in an external apparatus outside the information processing apparatus 1.

The sensor 10 is a sensor (measurement apparatus) for obtaining information about its external environment as sensor information. In the present exemplary embodiment, the sensor 10 is a stereo camera and obtains a stereo image as the sensor information. The sensor 10 according to the present exemplary embodiment is a camera mounted on the vehicle, and thus captures an image of an environment where the vehicle travels.

The control apparatus 11 refers to a control apparatus or actuator for controlling the vehicle based on control values calculated by the control value determination unit 17. Examples include a motor, a power cylinder, and a power converter for driving a wheel or a steering device. In the present exemplary embodiment, the control apparatus 11 includes wheel motors of a two-wheel-drive cart. The control values specifically refer to the numbers of rotations of two drive wheels, the left and right wheels. Straight traveling and turning of the vehicle are implemented by changing the control values.

The sensor information input unit 12 receives input about the measurement of a distance between the sensor 10 (vehicle) and the surrounding environment, measured by the sensor 10, as the sensor information. In the present exemplary embodiment, the sensor information input unit 12 receives input of the image obtained by the sensor 10 as the sensor information, and outputs the sensor information to the position and orientation estimation unit 13. Specifically, an image of the environment around the vehicle, captured by the camera mounted on the vehicle, is used as the sensor information. Relative distances between the vehicle (measurement apparatus) and objects nearby can be estimated from the sensor information.

The position and orientation estimation unit 13 calculates the position and orientation of the sensor 10 by using the sensor information input by the sensor information input unit 12 and map information stored in the map storage unit 14. The position and orientation estimation unit 13 outputs calculated position and orientation values to the control value determination unit 17. The map information according to the present exemplary embodiment includes key frame group information including one or a plurality of pieces of key frame information indicating a specific object in a real space. Using the map information, the position and orientation estimation unit 13 can compare features of feature points obtained from the sensor information with features of feature points measured in advance, and measure the position and orientation of the sensor 10 in a map coordinate system. In position and orientation estimation, the position and orientation of the sensor 10 are calculated so that coordinates of an index extracted from the sensor information measured by the sensor 10 coincide with coordinates of the index registered in the map information, as is typical in the SLAM technique.

The control value determination unit 17 receives input about the position and orientation calculated by the position and orientation estimation unit 13, and calculates the control values for driving the control apparatus 11. The control values refer to the numbers of rotations of the respective left and right wheels of the two-wheel-drive cart. The control value determination unit 17 calculates the control values for controlling the control apparatus 11 so that the position and orientation of the vehicle at a target point of the vehicle, which is input from a not-illustrated input unit, coincide with the position and orientation calculated by the position and orientation estimation unit 13. The control value determination unit 17 outputs the calculated control values to the control apparatus 11.

The map storage unit 14 stores the map information that the position and orientation estimation unit 13 uses to calculate the position and orientation of the sensor 10. The map storage unit 14 outputs the map information to the update information generation unit 15. The map storage unit 14 may be located outside the information processing apparatus 1. As employed herein, the map information refers to a three-dimensional map such as a three-dimensional model of the environment, representing a structure or space of the environment. Specifically, the map information is three-dimensional point group data (or a combination of the three-dimensional point group data and color information) or a set of key frame data. Details of the map information and key frames will be described below.

The update information generation unit 15 generates update information for updating the map (map information) based on the positions of the feature points included in the map information stored in the map storage unit 14 and new positions of the feature points obtained from the sensor information. Here, the update information refers to information indicating differences between the positions of the feature points in the map information and the positions of the feature points obtained from the sensor information when the feature points included in the map information are observed by the sensor 10. The update information generation unit 15 outputs the generated update information about the map to the update information input unit 110. A method for updating the map information will be described below. Specifically, the update information includes the following information. First, the update information includes information for making a correction about a same predetermined point so that different positions thereof in the map coordinate system coincide based on the known positions of the feature points included in the map information and new positions of the feature points. The same point is determined based on whether the coordinates of key frames calculated by two methods have the same coordinate values (or similar coordinate values, in view of calculation errors). For example, the update information generation unit 15 compares a predetermined key frame seen from another key frame in a global coordinate system with the predetermined key frame in the global coordinate system. If a difference therebetween falls within a predetermined range, the update information generation unit 15 determines that the two points are the same. Secondly, the update information includes information including new feature point coordinates determined from the positions of feature points on images observed from a plurality of points of view. Thirdly, the update information includes (key frame coordinate) information including new positions of feature points obtained from the positions of the feature points on images observed from a plurality of points of view and a new position of the camera that has observed the feature points. In other words, the update information is information for updating the map information so that the positions of the feature points when the feature points in the environment are observed by the sensor 10 are associated and matched with the positions of the feature points in the map information.

The update information input unit 110 receives input of the update information about the map, generated by the update information generation unit 15. The update information input unit 110 outputs the input update information to the difference obtaining unit 120.

The difference obtaining unit 120 obtains a difference, or a distance, between a first position of the vehicle estimated from the sensor information and the map information and a second position of the vehicle estimated based on new positions of the feature points obtained from the sensor information. The sensor information indicates the three-dimensional positions of feature points obtained by observing the environment around the vehicle. The map information includes information about the three-dimensional positions of the feature points already observed. The difference obtaining unit 120 calculates a difference occurring in the position and orientation of the sensor 10 calculated by the position and orientation estimation unit 13 due to a map update, based on the update information input by the update information input unit 110 and the map information stored in the map storage unit 14. The difference refers to a value corresponding to the magnitude of change in the position and orientation of the vehicle calculated by the position and orientation estimation unit 13 before and after the map update. The difference obtaining unit 120 outputs the calculated difference to the update behavior determination unit 130. Detailed processing will be described below.

The update behavior determination unit 130 determines an update behavior of the map information based on the difference calculated by the difference obtaining unit 120. As employed in the present exemplary embodiment, the update behavior refers to a value normalized to a range of 0 to 1 that the map update unit 16 uses to determine whether to update the map. The update behavior determination unit 130 outputs the calculated update behavior to the map update unit 16. The greater (closer to 1) the value is, the more likely the map is to be determined to be updated. The smaller (closer to 0) the value is, the more likely the update is restrained.

The map update unit 16 rewrites the map information stored in the map storage unit 14 based on the update behavior. The map update unit 16 updates the map information based on the update information. The map update unit 16 may update the map information at a time or over a plurality of times depending on the update behavior. If the obtained difference is small, the map update unit 16 restrains the map update at that stage.

The map information according to the present exemplary embodiment includes the key frame group information including one or a plurality of pieces of key frame information. The map information is generated by moving the vehicle, on which the sensor 10 is mounted, within the environment in advance before actual operation of the vehicle. For example, the map (map information) is generated by combining pieces of sensor information obtained by the sensor 10 mounted on the vehicle while operating the vehicle by a remote controller or manually. Alternatively, the vehicle may move autonomously in the environment to generate the map information by using the SLAM technique. The SLAM refers to a technique for accurately estimating the position and orientation of the device while recognizing the surrounding environment with a sensor. If key frame data is used as the map information, first, a key frame closest to the position and orientation estimated in the previous frame is selected. The pixels in the current frame are projected on the key frame by using the position and orientation in the previous frame, based on a depth map. Next, pixel values of the projected frame and pixel values of the key frame are matched to estimate a position and orientation so that luminance differences are minimized. The position and orientation of the key frame are also updated by graph optimization at predetermined timing such as loop closure.

A key frame refers to a minimum unit of map element for the position and orientation estimation unit 13 to calculate the position and orientation of the sensor 10. Key frame information, to be described below, obtained from image information about an image captured by the camera at a point is stored in association with the position and orientation of the camera at the point in time. In position and orientation estimation, the position and orientation of the camera with respect to a key frame are calculated based on the image captured by the camera and the key frame information. The calculated position and orientation of the camera are further multiplied by the position and orientation of the key frame, whereby the position and orientation of the sensor 10 in the global coordinate system are calculated.

The key frame information refers to a data structure of the key frame. The key frame information is a combination of depth maps obtained at constant intervals and color information obtained from images. A depth map is a quantized color gradation representation of depth information seen from a certain point of view in the environment. The key frame may be any information for estimating a position and orientation. Examples include a combination of depth information and image information (color information) about a feature point in an image. The key frame information includes an identifier (ID) for uniquely identifying the key frame, image information about an image captured by the sensor 10, feature point information such as a corner detected from the image, and a matrix representing the position and orientation values of the key frame, i.e., the position and orientation of the sensor 10 at the point in time when the image is captured. The feature point information includes two-dimensional coordinates u and v of a feature point detected in the image (hereinafter, referred to as the two-dimensional position of the feature point or the position of the feature point), a feature amount (a small cropped patch of image around the feature point), and three-dimensional coordinates X, Y, and Z indicating a three-dimensional position in the space. The position and orientation values refer to matrix values of a 4×4 matrix M representing six parameters that include three parameters representing the position of the camera in the global coordinate system defined in the real space and three parameters representing the orientation of the camera.

The update information about the map according to the present exemplary embodiment refers to update values (key frame update information) for the key frame information to be updated in the key frame group information included in the map information. The key frame update information includes an ID for identifying each key frame to be updated included in a key frame group, the updated values of the position and orientation values of the key frame to be updated, and the updated values of the three-dimensional positions of feature points included in the key frame information to be updated. A plurality of pieces of key frame update information is referred to collectively as key frame group update information. The key frame group update information includes the key frame update information.

Figure 3:
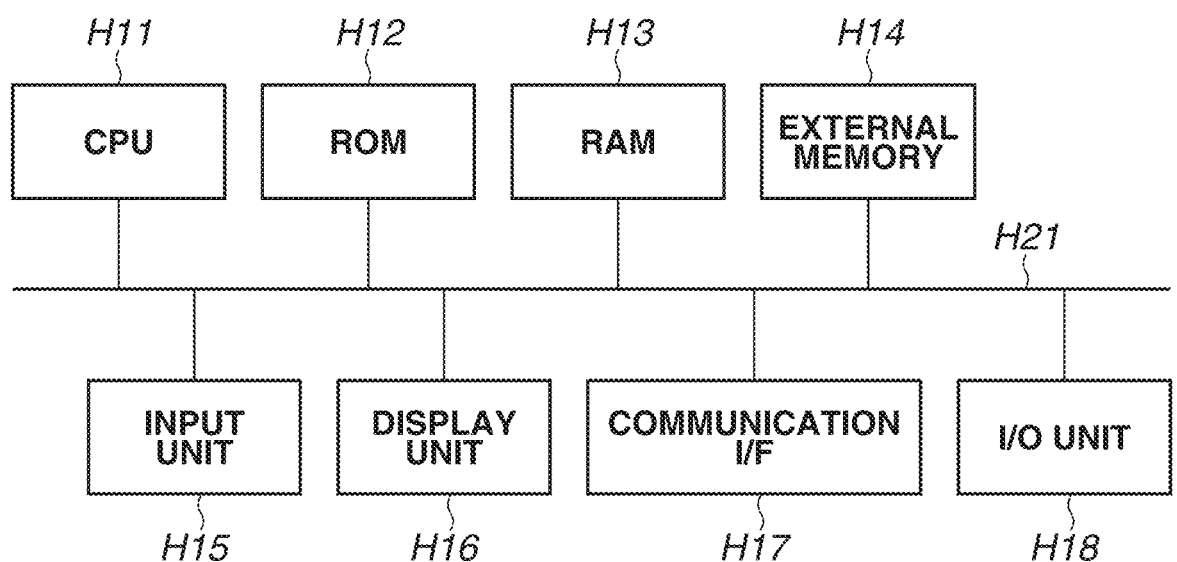
FIG. 3 is a diagram illustrating a hardware configuration example of the information processing apparatus.

FIG. 3 is a diagram illustrating a hardware configuration of the information processing apparatus 1. A central processing unit (CPU) H11 controls various devices connected to a system bus H21. A read-only memory (ROM) H12 stores a basic input/output system (BIOS) program and a boot program. A random access memory (RAM) H13 is used as a main storage device of the CPU H11. An external memory H14 stores a program to be executed by the information processing apparatus 1. An input unit H15 includes a keyboard, a mouse, a button, and/or a switch, and performs processing related to information input. A display unit H16 outputs a calculation result to a display device based on instructions from the CPU H11. The display device may be of any type. Examples include a liquid crystal display, a projector, and a light-emitting diode (LED) indicator. A communication interface (I/F) H17 performs information communication via a network. The communication I/F H17 may be an Ethernet® I/F. The communication I/F H17 may be of any type. Examples include Universal Serial Bus (USB), serial communication, and wireless communication I/Fs. In the present exemplary embodiment, a target position of the vehicle is input via the communication I/F H17. In the present exemplary embodiment, an input/output (I/O) unit H18 is used when the update information input unit 110 receives the input of the update information from the update information generation unit 15 and when the update behavior calculated by the update behavior determination unit 130 is output to the map update unit 16.

Figure 2:
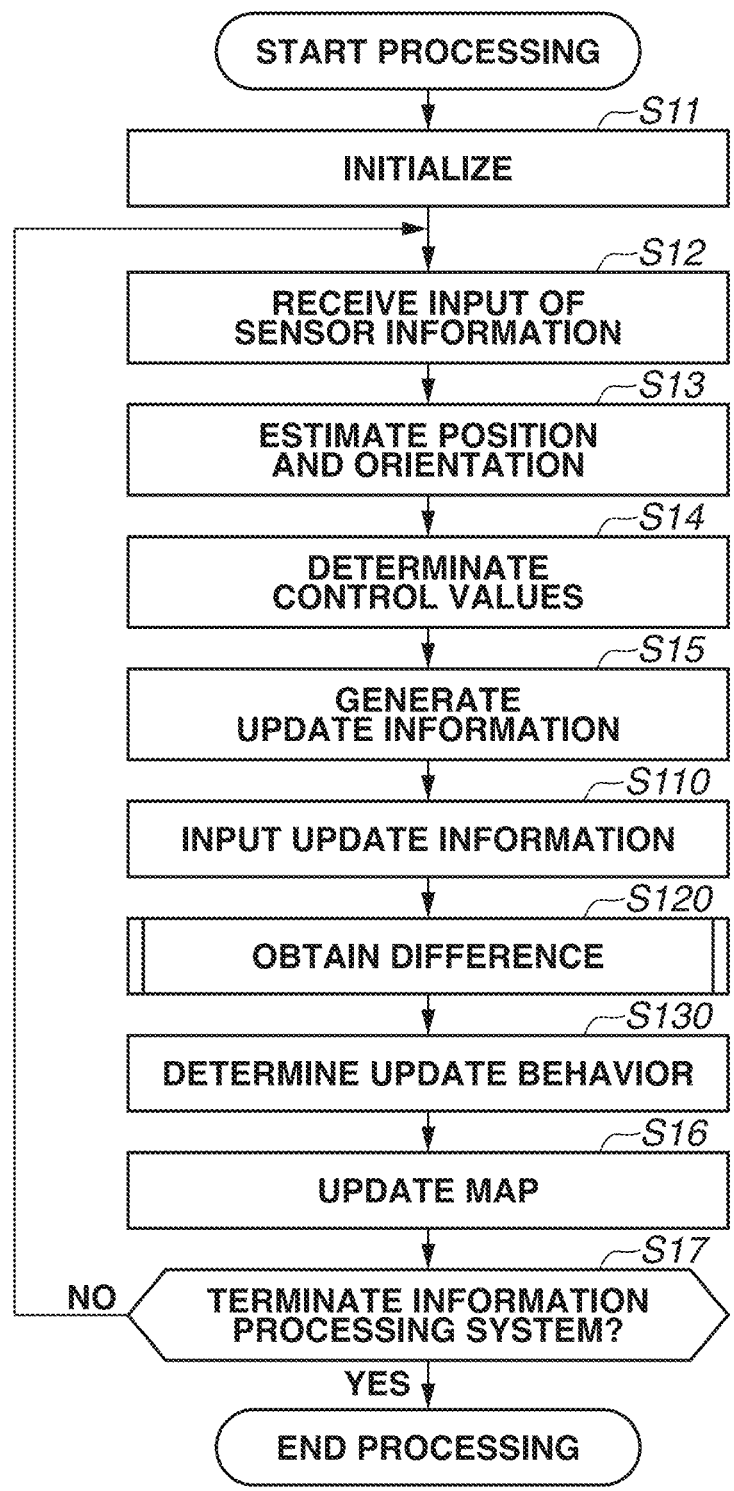
FIG. 2 is a flowchart illustrating a processing procedure performed by the information processing apparatus.

Next, a processing procedure according to the present exemplary embodiment will be described. FIG. 2 is a flowchart illustrating a processing procedure of the information processing system 100 including the information processing apparatus 1 according to the present exemplary embodiment. The processing procedure includes the following processing steps: an initialization step (step S11), a sensor information input step (step S12), a position and orientation estimation step (step S13), a control value determination step (step S14), an update information generation step (step S15), a map update step (step S16), a termination determination step (step S17), an update information input step (step S110), a difference obtaining step (step S120), and an update behavior determination step (step S130).

In step S11, the information processing apparatus 1 initializes the information processing system 100. Specifically, the CPU H11 reads programs and map information from the external memory H14 into the RAM H13. The CPU H11 also obtains the following values that the position and orientation estimation unit 13 uses to estimate a position and orientation: internal parameters (focal lengths $f_x$ (in a horizontal direction of the image) and $f_y$ (in a vertical direction of the image), image center positions $c_x$ (in the horizontal direction of the image) and $c_y$ (in the vertical direction of the image), and lens distortion parameters) of the sensor 10 (camera). The CPU H11 also reads various parameters including parameters of the control apparatus 11 (such as the size of the vehicle, a wheel diameter, and a motor torque value) from the external memory H14 into the RAM H13. The CPU H11 activates the sensor 10 and the control apparatus 11, and makes the information processing system 100 including the information processing apparatus 1 operable and controllable. After completion of the initialization, the processing proceeds to step S12 (sensor information input step).

In step S12, the sensor information input unit 12 receives input of the sensor information obtained by measuring surroundings of the measurement apparatus (vehicle). Here, the sensor information input unit 12 receives the input of an image captured by the camera that is the sensor 10. The input image is converted into a corrected image where an effect of lens distortion is removed by using the internal parameters. The sensor information input unit 12 outputs the corrected image to the position and orientation estimation unit 13. Hereinafter, the corrected image will be referred to as an image. Then, the processing proceeds to step S13 (position and orientation estimation step).

In step S13, the position and orientation estimation unit 13 estimates the position and orientation (first position and orientation) of the vehicle based on the positions of feature points obtained from the sensor information obtained by measuring the surroundings of the measurement apparatus and the map information including the positions of the feature points existing in the environment. In other words, the position and orientation estimation unit 13 calculates the position and orientation of the sensor 10 by using the image input by the sensor information input unit 12 and the map information stored in the map storage unit 14. The position and orientation of the sensor 10 are estimated by using a method of Raul et al. (Raul Mur-Artal et al., ORB-SLAM: A Versatile and Accurate Monocular SLAM System. IEEE Transactions on Robotics). First, the position and orientation estimation unit 13 matches the feature points detected from the image that is the sensor information with the feature points included in the key frame information. Next, the position and orientation estimation unit 13 calculates the position and orientation of the sensor 10 by utilizing a Perspective-n-Point (PnP) camera pose estimation based on a correspondence relation between the three-dimensional coordinates of the matched feature points and the two-dimensional positions of the detected feature points on the image. The position and orientation estimation unit 13 outputs the calculated position and orientation to the control value determination unit 17. Then, the processing proceeds to step S14.

In step S14, the control value determination unit 17 determines control values such that the vehicle approaches the target point set in advance, based on the position and orientation of the vehicle. In other words, the vehicle is moved based on the map information indicating the position and orientation of the vehicle at the target point (or route), and the position and orientation of the sensor 10 estimated by the position and orientation estimation unit 13. To calculate the control values, the control value determination unit 17 calculates all possible variations of the control values that reduce the Euclidean distance between the position and orientation of the vehicle and the position and orientation at the target point in the map information as control value candidates. The control value determination unit 17 uses a dynamic window approach (DWA) to select optimum control values from the control value candidates. The control value determination unit 17 outputs the calculated control values to the control apparatus 11. After the output of the control values, the processing proceeds to step S15 (update information generation step).

In step S15, the update information generation unit 15 generates the update information. The update information is generated by using loop detection and pose graph optimization discussed in the method of Raul et al. (Raul Mur-Artal et al., ORB-SLAM: A Versatile and Accurate Monocular SLAM System. IEEE Transactions on Robotics). First, the update information generation unit 15 performs the loop detection to select two pieces of key frame information where different positions and orientations are calculated for physically the same point from the key frame group information included in the map information. Next, the update information generation unit 15 performs the pose graph optimization to calculate update values for the position and orientation values of key frame information about key frames nearby and update values for the three-dimensional coordinates of the feature points so that the positions and orientations included in the two pieces of key frame information are matched with each other. The procedure will be described in more detail. First, the update information generation unit 15 matches the feature point of key frame A with the feature point of key frame B. Using the three-dimensional (3D) coordinates of the matched feature point in the key frame A and the two-dimensional (2D) coordinates of the feature point on the image of the key frame B, the update information generation unit 15 performs 3D-to-2D position and orientation calculation (whereby the coordinates in the key frame B seen from the key frame A are found). The update information generation unit 15 performs 2D projection processing from the 3D coordinates of the feature point in the key frame A onto the key frame B by using the calculated A-to-B positions and orientations, and checks whether the feature point is projected on a predetermined position. The update information generation unit 15 performs total optimization so that the coordinates of key frame B seen from key frame A coincide with the coordinates of key frame B. Thus, the update information generation unit 15 inputs a plurality of pieces of key frame update information that has been calculated into the update information input unit 110 as key frame group update information, i.e., update information. Then, the processing proceeds to step S110 (update information input step).

In step S110, the update information input unit 110 inputs the update information generated by the update information generation unit 15 into the difference obtaining unit 120. Then, the processing proceeds to step S120.

In step S120, the difference obtaining unit 120 obtains a difference indicating the magnitude of change in the position and orientation estimated by the position and orientation estimation unit 13 before and after a map update by using a change between the position and orientation of the sensor 10 in the original map information and the position and orientation of the sensor 10 in the update information, and the update information. First, the difference obtaining unit 120 calculates distances between key frames to be updated and the sensor 10. Specifically, the difference obtaining unit 120 obtains the 3D Euclidean distances between the coordinates of the key frames to be updated and the coordinates of the sensor 10 based on the update values for the positions of the key frames to be updated included in the respective pieces of key frame update information in the key frame group update information and the position of the sensor 10. Next, the difference obtaining unit 120 determines the minimum Euclidean distance among the Euclidean distances calculated for the respective key frames to be updated. In the present exemplary embodiment, the reciprocal of the minimum Euclidean distance is used as a difference value (difference). In other words, the greater the distance (the less position and orientation measurement is affected), the more likely the map is to be updated. The difference obtaining unit 120 outputs the difference value calculated by the position and orientation measurement to the update behavior determination unit 130. Then, the processing proceeds to step S130.

In step S130, the update behavior determination unit 130 determines the update behavior that the map update unit 16 uses to determine whether to update the map based on the difference calculated by the difference obtaining unit 120. An example of the update behavior is a real number obtained by normalizing a value indicating easiness of update to the range of 0 to 1. The smaller the difference value, the closer to 0 the update behavior is. The greater the difference value, the closer to 1 the update behavior is. In the present exemplary embodiment, an exponential function with a value obtained by multiplying the difference value calculated by the difference obtaining unit 120 in step S120 by −1 as the exponent is used for normalization. Based on the value indicating the easiness of update thus determined, the update behavior determination unit 130 determines to perform an update method if the value indicating the easiness of update is greater than or equal to a predetermined threshold. The update behavior determination unit 130 outputs the update behavior in updating the map to the map update unit 16. Then, the processing proceeds to step S16. Alternatively, the update behavior determination unit 130 may be set to change the update behavior based on the value indicating the easiness of update or the update information. If the value indicating the easiness of update is less than a threshold, the map is not updated. In such a case, the update behavior determination unit 130 inputs information indicating an absence of update to the map update unit 16.

In step S16, the map update unit 16 determines whether to update the map information stored in the map storage unit 14 based on the update behavior determined by the update behavior determination unit 130 in step S130. If the map information is determined to be updated, the map update unit 16 updates the map. In the present exemplary embodiment, the map update unit 16 rewrites the map information stored in the map storage unit 14 based on the update information about the map. Then, the processing proceeds to step S17. If the value indicating the easiness of update is less than a threshold, the map update unit 16 restrains an update of the map at that stage, and the processing proceeds to step S17. In such a case, for example, the map is updated after a predetermined time, or updated stepwise over a plurality of times based on the update behavior. For example, if the region of the map to be updated is far from the sensor 10, the map update unit 16 updates the map. If the region of the map to be updated is close to the sensor 10, the map update unit 16 restrains an update of the map.

In step S17, the CPU H11 determines whether to terminate the information processing system 100. If a command to terminate the information processing system 100 is input by a user via the input unit H15 such as a mouse and a keyboard (YES in step S17), the CPU H11 terminates the information processing system 100. If not (NO in step S17), the processing returns to step S12 to continue the position and orientation estimation and the map update processing.

In the first exemplary embodiment, amounts of change in position measurement values due to an update can be reduced by allowing a map update when the sensor 10, i.e., the vehicle, is away from the update region. This can reduce abrupt changes in the speed and direction of the vehicle.

In the present exemplary embodiment, the difference obtaining unit 120 calculates the difference based on the distances between the respective key frames to be updated and the sensor 10. However, the exemplary embodiment is not limited to the foregoing. The difference obtaining unit 120 can calculate any difference value that is calculated based on the key frame update information and that reduces the amount of change in the position and orientation of the sensor 10 due to a map update, calculated by the foregoing position and orientation estimation unit 13. For example, differences in orientation between the respective key frames to be updated and the sensor 10 may be used as the difference. A difference in orientation refers to an angular difference between the update value for the orientation of the key frame to be updated included in each piece of key frame update information in the key frame group update information and an orientation value of the sensor 10 calculated by the position and orientation estimation unit 13. Specifically, the update of the map can be switched based on a traveling direction when the vehicle travels a circulating route in a reverse direction or returns on a reciprocating route. Alternatively, the difference obtaining unit 120 may calculate a convex hull space circumscribing the foregoing key frame group to be updated, and calculate the difference based on a distance between the surface of the convex hull space and the sensor 10. Moreover, the difference obtaining unit 120 may calculate a binary value indicating whether the sensor 10 is located in the convex hull space. Specifically, the difference obtaining unit 120 determines that the difference is 1 if the sensor 10 is located in the convex hull space, and 0 if the sensor 10 is not located in the convex hull space.

In the present exemplary embodiment, the reciprocal of the distance between the sensor 10 and a surrounding object nearby is calculated as the difference. However, the difference is not limited to the reciprocal of the distance, and any setting method may be used as long as the difference value decreases as the distance increases. For example, to calculate the difference from the distance between the sensor 10 and a surrounding object nearby, an arccotangent function may be used. An exponential function with the negative value of the distance value as the exponent may be used. A sigmoid function into which the distance value is substituted, multiplied by −1, and to which 1 is added may be used.

The difference obtaining unit 120 may be configured to calculate the difference based on distances between the 3D coordinates of feature points included in the respective pieces of key frame update information in the key frame group update information and the sensor 10. With such a configuration, the difference obtaining unit 120 determines feature point information about a feature point that has the minimum Euclidean distance to the sensor 10 among the pieces of feature point information included in the key frame group update information. Here, the difference obtaining unit 120 calculates the reciprocal of the distance value from the feature point at the minimum Euclidean distance as the difference value. The feature point at the minimum Euclidean distance is not restrictive, and any feature point may be used as long as a distance from an update range can be measured. Specifically, a predetermined number of feature points at small distances from the sensor 10 may be selected, and an average or median value of the distances between the feature points and the sensor 10 may be used. The number of feature points located within a predetermined distance from the sensor 10 may be calculated as the difference value.

The difference can also be calculated based on the size of the range included in the update information, i.e., the size of the region where the key frame group is included. Specifically, the wider the update region, the greater the calculated difference. More specifically, the difference obtaining unit 120 calculates the volume of the foregoing convex hull space of the key frame group to be updated, and calculates the reciprocal of the volume value as the difference value. Alternatively, the difference value may be the reciprocal of the surface area of the convex hull space. The reciprocal of the volume of an ellipse circumscribing or inscribing the convex hull space or the reciprocal of the length of the major axis of the ellipse may be used. While the convex hull space is calculated to include the key frame group, the convex hull space may be calculated to include the feature points included in the update information.

The update behavior is not limited to that described in the present exemplary embodiment, as long as a change in the timing of map update can be seen. For example, the difference obtaining unit 120 may be configured to calculate the differences for each key frame to be updated, and calculate the update behavior for each key frame to be updated. With such a configuration, the update is controlled key frame by key frame. The map update unit 16 thereby updates key frames of small differences early, and not update key frames of large differences. This can reduce abrupt changes in the calculated position and orientation while steadily updating the map.

The greater the difference in the estimated position of the vehicle before and after an update, the longer time the map update unit 16 can take to gradually update the positions and orientations of key frames or feature points to their updated values. Specifically, the map update unit 16 updates a key frame stored in the map storage unit 14 by using a combined position and orientation obtained by combining the position and orientation of the key frame to be updated included in the key frame group update information and the position and orientation of the key frame stored in the map storage unit 14 as a weighted sum. As illustrated in FIG. 11, if the update behavior of the map (here, a change in the position of a feature point before and after an update) is large, the amount of update applied to the map is suppressed to a predetermined threshold, and the position of the feature point is gradually corrected over a plurality of times to prevent an abrupt change in the camera position. In particular, the greater the update behavior of the map, the more gently the camera position can be changed by increasing the number of corrections. The weights on the positions and orientations of the key frames included in the key frame group are increased each time the positions and orientations are measured. The greater the update behavior, the smaller the value of the rate of increase. Thus, updating the map more slowly as an effect on the position and orientation estimation is higher reduces the amounts of change in the position measurement values due to an update, and reduces abrupt changes in the speed and direction of the vehicle.

In the present exemplary embodiment, to update the map means to update the values of map components, i.e., to update the positions and orientations of key frames and the 3D positions of feature points. The update method of the map according to the present exemplary embodiment can also be used in switching maps, i.e., in replacing some of the key frame groups included in the map information with new key frame groups stored in a not-illustrated storage unit. In such a configuration, the difference obtaining unit 120 calculates the difference with the new key frame group information as the key frame group update information. This reduces the amount of change in the position measurement values calculated in switching the maps and reduces abrupt changes in the speed and direction of the vehicle.

Furthermore, the update method of the map according to the present exemplary embodiment is not limited to the switching of maps and can also be applied to loading of a global map, stored in a not-illustrated storage unit, into the map storage unit 14 as a local map. This can reduce abrupt changes in the speed and direction of the vehicle, for example, when a map generated by another vehicle is loaded to update the own map (added to the map stored in the map storage unit 14). Similarly, abrupt changes in the speed and direction of the vehicle upon loading a map (adding a map to the map stored in the map storage unit 14) are reduced, for example, in loading part of a map stored in a cloud server as a local map and estimating the position and orientation.

In the present exemplary embodiment, the map information refers to the key frame group. However, the map information is not limited thereto and may include any index used to calculate the position and orientation of the sensor 10. For example, suppose that the position and orientation are estimated by measuring the position of an object as an index, i.e., the position and orientation are calculated based on the 3D coordinates of an object captured by the camera. In such a configuration, the object and the 3D coordinates serve as the map information. With such a configuration, the difference can be calculated by the method according to the present exemplary embodiment if update values for the position and orientation of the object are handled as the key frame update information according to the present exemplary embodiment.

The map information may be configured to not include key frames, i.e., to include only feature points. Even in such a configuration, the difference according to the present exemplary embodiment can be calculated by using update values for the 3D positions of the feature points as the key frame update information according to the present exemplary embodiment.

As a modification, if a light detection and ranging (LiDAR) sensor is used as the sensor 10, a scan point group or an occupancy grid map (a map having a data structure in which passable areas and impassable areas such as walls are plotted on a grid) measured by the LiDAR sensor can be used. The present exemplary embodiment can be applied to such a configuration using the LiDAR sensor if grid cells are regarded as the feature points according to the present exemplary embodiment. Specifically, the difference is calculated by the method used in the present exemplary embodiment based on distance values from the respective grid cells. Such a method is not restrictive. If a grid cell to be updated is regarded as an update region, a distance from the update region to the sensor 10 can be determined. Whether the sensor 10 is located in the update region can also be determined based on whether the grid cell where the sensor 10 is located is to be updated. Thus, the present exemplary embodiment can be applied to the configuration using the LiDAR sensor.

In the present exemplary embodiment, the update information refers to the key frame update information included in the key frame group update information, or equivalently, the updated values of the key frames to be updated or the updated values of the feature points. The update information is not limited thereto, and may be any information capable of updating the map. Specifically, the update information may be correction values (amounts of difference) for the elements of the map stored in the map storage unit 14.

In the present exemplary embodiment, the update information is described to be stored as the key frame update information. However, the configuration for storing update values for rewriting the elements of the map stored in the map storage unit 14 is not limited to the configuration storing the update values as the key frame update information. Specifically, the values of only the IDs for identifying the key frames, the updated positions and orientations, and the updated 3D positions of the feature points may be stored as the update information. If the occupancy grid map described in the foregoing modification is used as the map information, the coordinates of the grid cells and the rewrite values may be stored as the update information.

In the present exemplary embodiment, the update information is generated by detecting a loop and determining the update values for the positions and orientations of key frames to be updated and the update values for the 3D positions of feature points by the pose graph optimization. However, the generation of the update information is not limited to the foregoing method. For example, instead of the pose graph optimization, bundle adjustment described in the method of Raul et al. (Raul Mur-Artal et al., ORB-SLAM: A Versatile and Accurate Monocular SLAM System. IEEE Transactions on Robotics) may be used. The update values for the positions and orientations of key frames may be determined based on a position and orientation calculated by an inertial measurement unit (IMU) or by using a Kalman filter for establishing consistency with odometrical measurements determined from integral values of the numbers of rotations of the wheels of the vehicle.

Furthermore, the present exemplary embodiment can also be applied to a case where a map is added, i.e., new key frame information is added to the key frame group information included in the map information. In such a case, the method according to the present exemplary embodiment can be applied by using the newly added key frame information as the key frame update information.

In the present exemplary embodiment, the sensor 10 is the camera. Any camera that can obtain an image usable for position and orientation measurement may be used as the camera. Examples include a monochrome camera, a color camera, a stereo camera, and a depth camera. Any sensor information capable of position and orientation estimation may be used depending on the camera. Examples of the sensor information include a monochrome image, a red-green-blue (RGB) image, and a depth map.

Moreover, the sensor 10 may be any sensor capable of obtaining the sensor information that can be used for position measurement, including the LiDAR sensor. Examples may include a 2D LiDAR sensor and a 3D LiDAR sensor. Any sensor information capable of the position and orientation estimation may be used depending on the type of sensor. Examples of the sensor information include a 2D point group and a 3D point group.

The sensor 10 is not limited to the foregoing, and any sensor that can calculate a position and orientation based on the map information and a sensor value measured by the sensor 10 may be used.

The target control apparatus 11 is not limited to the one controlling wheels, and may be any control unit that can change the speed, acceleration, angle, angular velocity, and/or angular acceleration of the vehicle. For example, the control apparatus 11 may control a steering wheel, and if the vehicle is a drone, may control the amounts of rotation of propellers.

The information processing apparatus 1 can be applied to any configuration that calculates a position and orientation by using an updated map. For example, the vehicle may be a mobile robot, an automatic guided vehicle (AGV), autonomous mobile robot (AMR), unmanned ground vehicle (UGV), autonomous underwater vehicle (AUV), an unmanned carrier, a self-driving vehicle, or an unmanned aerial vehicle (UAV) such as drone. The movement control described in the present exemplary embodiment may be applied thereto. The movement control described in the present exemplary embodiment may also be applied to vehicles that fly and move in the air, vehicles that move on the water, and vehicles that submerge and move in the water, aside from vehicles walking or running on the ground.

In the present exemplary embodiment, the information processing apparatus 1 is described to be included in the information processing system 100. However, the information processing apparatus 1 may be located anywhere as long as the information processing apparatus 1 can calculate the update behavior of the map. For example, the information processing apparatus 1 may be located on a cloud server separate from the information processing system 100, or in another information processing system. Operation timing thereof may be freely set. While, in the present exemplary embodiment, the processing steps are described to be processed in succession, specific processing such as the processing of steps S15 and S16 may be run as another thread separate from that of steps S12 to S14 in parallel.

In the present exemplary embodiment, whether to update the map is described to be determined each time an image is input. However, such a configuration for determining whether to update the map each time an image is input is not restrictive, and whether to update the map may be determined at predetermined timing.

Specifically, step S15 (update information generation step) may be configured to proceed to step S110 and the subsequent steps each time a key frame is added. Alternatively, step S110 and the subsequent steps may be performed only if a loop is detected by matching between a newly added key frame and the key frames stored in the map storage unit 14. In such a configuration, step S110 and the subsequent steps are performed only if the map can be updated. Thus, whether to update the map can be determined with a reduced processing load.

The information processing apparatus 1 may include a not-illustrated presentation unit. For example, a three-color lamp of a red, yellow, and green lights may be used as the presentation unit. The lamp is lit in green when the map is not being updated, and in yellow when the map is being updated. This can visualize that the map is being updated to the user. The indication colors may be freely set as long as the visualization of the map being updated can be presented to the user. The presentation unit may be any member as long as the information about a map update status can be presented to the user. Examples include an LED lamp and a liquid crystal display. The presentation unit may be a speaker, which can be configured to make a specific alarm sound or play a specific melody based on the map update status.

Figure 4:
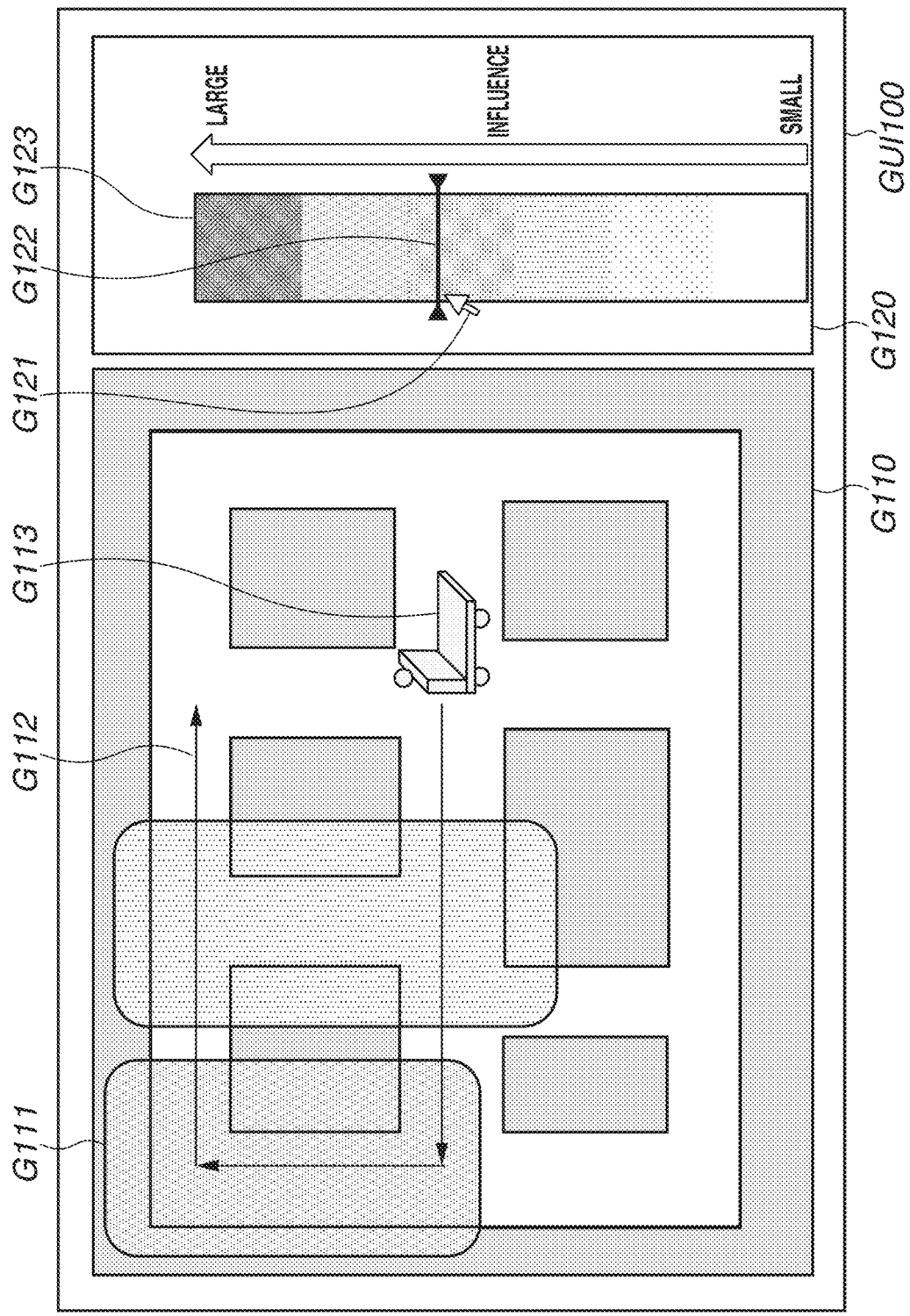
FIG. 4 is a diagram illustrating an example of a graphical user interface (GUI).

The presentation unit may present the difference, the update behavior, and/or the update range as information about a map update. FIG. 4 illustrates an example where the presentation unit includes a display, and displays a graphical user interface (GUI) GUI100 for presenting the map information, the difference, and the update range.

A presentation region G110 presents the map information and the difference. An index G111 indicates the range of map update and the difference value. In the modification, the greater the difference, the darker the color of the map update region. The presentation region G110 presents a moving route G112 of the vehicle and a current position G113 of the vehicle.

A GUI G120 is intended for the user to adjust a map update parameter. A mouse cursor G121 can vertically move a threshold adjustment bar G122 to determine the degree of difference up to which the map is allowed to be updated. An index G123 represents the magnitudes of difference.

In such a manner, the region where the map is updated can be more easily presented to the user, and the user can adjust the threshold to allow a map update. This allows the user to intuitively understand the difference due to a map update.

While a display is described to be used as the presentation unit, the presentation unit may be a speaker. The presentation unit can be configured to change the volume or pitch of the alarm sound or the type of melody based on the difference of the region that the vehicle is passing through.

In the first exemplary embodiment, the difference obtaining unit 120 is described to obtain the difference by using the distance from the update region. In a second exemplary embodiment, the difference is calculated based on the amount of change in an update element. In the present exemplary embodiment, the amount of change refers to the magnitude of a change in position due to an update of a key frame to be updated included in the key frame group update information. The greater the change in the position of the key frame, the greater the amount of change in the calculated position and orientation of the sensor 10. Thus, a configuration for calculating the difference that is larger as the amount of change in the position of a key frame is larger will be described.

An information processing apparatus according to the second exemplary embodiment has a configuration different from that of FIG. 1, which illustrates the configuration of the information processing apparatus 1 described in the first exemplary embodiment, in that the map information stored in the map storage unit 14 is input by the difference obtaining unit 120. Similar to the first exemplary embodiment, the information processing apparatus has the hardware configuration illustrated in FIG. 3.

A processing procedure according to the second exemplary embodiment is similar to that of FIG. 2, which illustrates the processing procedure of the information processing apparatus 1 described in the first exemplary embodiment. Thus, a description thereof will be omitted. A difference from the first exemplary embodiment lies in details of the processing of step S120 (difference obtaining step).

In step S120 (difference obtaining step), the difference obtaining unit 120 calculates the amounts of change in the positions of the key frames to be updated included in the key frame update information included in the key frame group update information. In the present exemplary embodiment, the magnitude of a change in position refers to a Euclidean distance between the coordinates of a key frame before an update and the coordinates of the key frame after the update. The difference obtaining unit 120 outputs the maximum value of the distance values calculated of the respective key frames to be updated included in the key frame group update information as the difference to the update behavior determination unit 130. Then, the processing proceeds to step S130.

In the second exemplary embodiment, the update behavior of the map is calculated based on the amount of change in an update element. Specifically, the map is updated if a change in the update element of the map is less than or equal to a predetermined value. The map is not updated if the update behavior exceeds a predetermined level. With such a configuration, the amount of change in the position measurement value due to an update is prevented from reaching or exceeding a predetermined level. This reduces abrupt changes in the speed and direction of the vehicle.

In the second exemplary embodiment, the difference is calculated based on the Euclidean distances from the coordinates of key frames before and after a map update. However, the difference may be calculated by using any value based on the amount of change in the update element of the map. Specifically, the amount of change in the orientation of a key frame may be used. The amount of change in the 3D position of a feature point may be used. Further, the amount of change is not limited to a geometrical change in the position or orientation of a component of the map, and may be the amount of any change of a map element used for position and orientation measurement. Specifically, if a feature point stores a histogram of gradient directions within a local area of a smoothed image as a feature amount, such as a scale-invariant feature transform (SIFT) feature amount and an Oriented FAST and Rotated BRIEF (ORB) feature amount, an update amount of the feature amount may be used. An update of a feature amount refers to processing for averaging the feature amounts of feature points that have similar 3D coordinates and feature amounts and are regarded to be the same one in feature point information included in a plurality of pieces of key frame information, or processing for replacing such feature amounts with a representative value. The update amount of a feature amount is determined, for example, based on the norms of or a cosine similarity value between the ORB or SIFT feature amount vectors before and after an update. If not only descriptors but small patches of areas of feature points for a plurality of points of view are also smoothened for an update, values such as a total, average, and maximum value of changes in the luminance of the patches before and after an update may be used.

The rate of indexes that change among the map indexes used by the position and orientation estimation unit 13 in estimating the position and orientation of the sensor 10 may be used as the amount of change. For example, the rate of feature points of which the 3D positions move by a predetermined distance or more before and after a map update among the feature points used in estimating the position and orientation is used as the amount of change. Not only a change in position but also a change in the number of map elements may be used as the amount of change. Specifically, a change in the number of feature points used for position and orientation estimation may be used. Moreover, a change in the number of key frames referred to or the rate thereof may be used.

If a LiDAR sensor is used as the sensor 10, to which grid cell a certain grid element of the occupancy grid map moves due to a map update may be calculated, and the Euclidean distance between the two grid cells before and after the update may be used as the difference. Furthermore, the amount of change in the value of each grid cell of the occupancy grid map due to a map update may be used as the difference. As employed herein, the value of each grid cell refers to the probability value of 0 to 1 representing whether there is an object in the occupancy grid map. In other words, the amount of change in the probability value of a specific grid cell before and after a map update may be used as the difference.

In the second exemplary embodiment, the difference is calculated based on the amount of change in a map element due to an update. In a third exemplary embodiment, the difference is calculated based not on the map elements but on the amount of change in the position and orientation of the sensor 10 that the position and orientation estimation unit 13 calculates before and after a map update. Specifically, a method for calculating the difference that becomes greater as the amount of change in the calculated position and orientation due to a map update becomes greater will be described.

An information processing apparatus according to the third exemplary embodiment has a configuration similar to that of FIG. 1, which illustrates the configuration of the information processing apparatus 1 described in the first exemplary embodiment. Thus, a description thereof will be omitted. Similar to the first exemplary embodiment, the information processing apparatus has the hardware configuration illustrated in FIG. 3. A difference from the first exemplary embodiment lies in the processing step where the difference obtaining unit 120 calculates the difference.

The overall processing procedure according to the third exemplary embodiment is similar to that of FIG. 2, which illustrates the processing procedure of the information processing apparatus 1 described in the first exemplary embodiment. Thus, a description thereof will be omitted. A difference from the first exemplary embodiment is that the difference obtaining unit 120, in step S120 (difference obtaining step), estimates the position and orientation of the sensor 10 that the position and orientation estimation unit 13 calculates after a map update.

Figure 5:
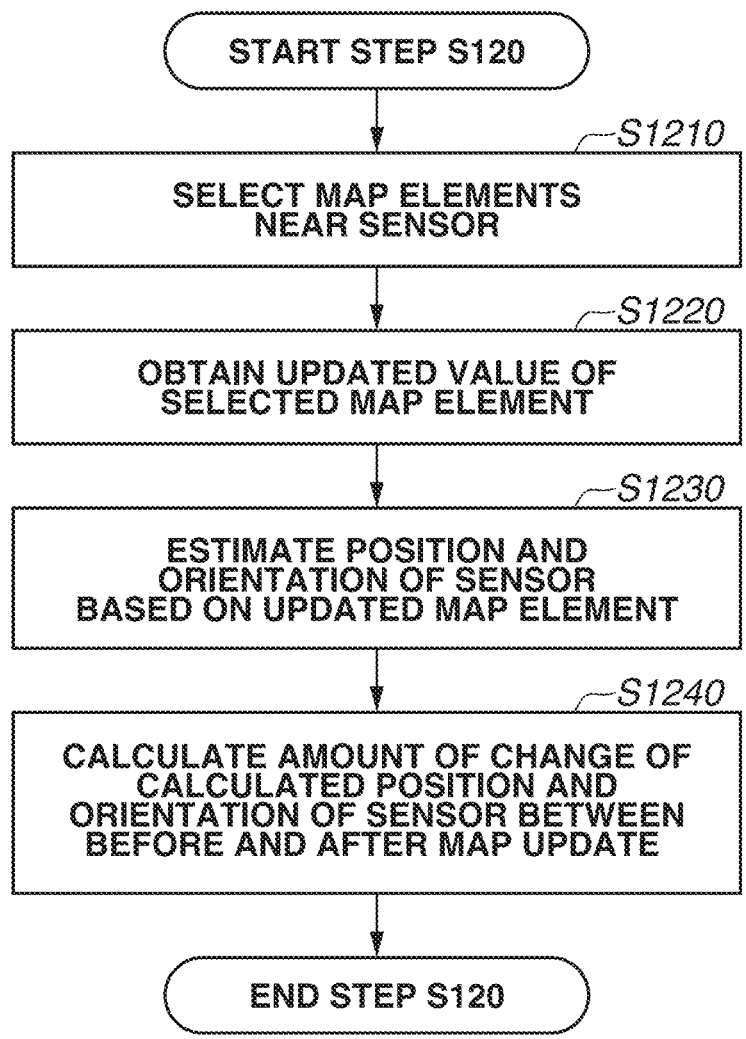
FIG. 5 is a flowchart illustrating details of processing.

FIG. 5 is a flowchart illustrating details of step S120 performed by the difference obtaining unit 120 according to the present third exemplary embodiment. In step S1210, the difference obtaining unit 120 selects map elements near the sensor 10. In the present exemplary embodiment, the difference obtaining unit 120 selects a predetermined number of pieces of key frame information about key frames located within a predetermined distance from the sensor 10 from among the key frames stored in the map storage unit 14 based on the position and orientation calculated by the position and orientation estimation unit 13. Then, the processing proceeds to step S1220. In the present exemplary embodiment, the selected key frame information is referred to as vicinity key frame information.

In step S1220, the difference obtaining unit 120 selects key frame information matching the IDs included in the pieces of vicinity key frame information from the key frame update information included in the key frame group update information input by the update information input unit 110. Then, the processing proceeds to step S1230. The selected key frame update information is referred to as vicinity key frame update information.

In step S1230, the difference obtaining unit 120 calculates the position and orientation of the sensor 10, or camera, after a map update (hereinafter, referred to as an update position and orientation) by using the vicinity key frame update information obtained in step S1220 and the image input by the sensor 10. While the update position and orientation are calculated by the method described in step S13, there is a difference in that the update information is used instead of the map information. After the calculation of the update position and orientation, the processing proceeds to step S1240.

In step S1240, the difference obtaining unit 120 calculates the distance between the update position and orientation calculated in step S1230 and the position and orientation of the sensor 10 calculated by the position and orientation estimation unit 13. As employed herein, the distance between the positions and orientations refers to the Euclidean distance between the coordinates of the sensor 10 calculated in step S1230 and the coordinates of the sensor 10 calculated by the position and orientation estimation unit 13. The reciprocal of the Euclidean distance thus calculated is used as the difference. Then, the processing proceeds to step S130.

In the third exemplary embodiment, the position and orientation of the sensor 10 are calculated by using the update elements in the map. The greater the amount of change in the position and orientation of the sensor 10 before and after the update, the greater the calculated difference. This reduces abrupt changes in the speed and direction of the vehicle.

In the present exemplary embodiment, the positions and orientations of the sensor 10 before and after a map update are calculated by using the update information. However, such a method is not restrictive, and any method that can estimate the amount of change in the position and orientation of the sensor 10 before and after a map update may be used. For example, the map elements used by the position and orientation estimation unit 13 in calculating the position and orientation of the sensor 10 may be used instead of the vicinity key frame information about the surrounds of the sensor 10. Specifically, the position and orientation estimation unit 13 identifies the used feature points in advance. Then, the difference obtaining unit 120 can estimate the update position and orientation based on the update values of feature point information matching the identified feature points included in the update information.

In the present exemplary embodiment, the position and orientation of the sensor 10 are calculated by using the update information. However, the amount of change in the position and orientation of the sensor 10 can be estimated from the amounts of change in the map elements nearby without position and orientation estimation. Specifically, a rigid transformation that minimizes the distances between coordinates of the feature points before and after an update is determined, and the determined rigid transformation is regarded as the amount of change in the position and orientation of the sensor 10. Alternatively, a rigid transformation that minimizes the distances between the coordinates of key frames before and after an update may be determined.

While the difference is calculated by using the reciprocal of the distance between the coordinates of the sensor 10 calculated before and after an update, any setting method may be used as long as the difference value decreases as the distance increases. An arccotangent function may be used. An exponential function with the negative value of the distance value as the exponent may be used. A sigmoid function into which the distance value is substituted, multiplied by −1, and to which 1 is added may be used.

In the third exemplary embodiment, the difference is calculated based on the amount of change in the position and orientation of the sensor 10 calculated before and after a map update. In a fourth exemplary embodiment, the difference is calculated based on the amounts of change in the control values of the vehicle calculated before and after a map update. Specifically, a method for calculating that there is a high impact if the direction of the vehicle changes greatly due to a map update will be described.

A diagram illustrating a configuration of an information processing apparatus according to the fourth exemplary embodiment is similar to FIG. 1, which illustrates the configuration of the information processing apparatus 1 described in the first exemplary embodiment. Thus, the diagram will be omitted. A difference from the first exemplary embodiment lies in the processing step where the difference obtaining unit 120 calculates the difference.

The overall processing procedure according to the fourth exemplary embodiment is similar to that of FIG. 2, which illustrates the processing procedure of the information processing apparatus 1 described in the first exemplary embodiment. Thus, a description thereof will be omitted. Unlike the first exemplary embodiment, the difference obtaining unit 120, in step S120 (difference obtaining step), estimates not only the position and orientation of the sensor 10 calculated by the position and orientation estimation unit 13 after a map update but also the control values calculated by the control value determination unit 17 after the map update. The difference obtaining unit 120 also calculates the amounts of change in the control values before and after the map update.

Figure 6:
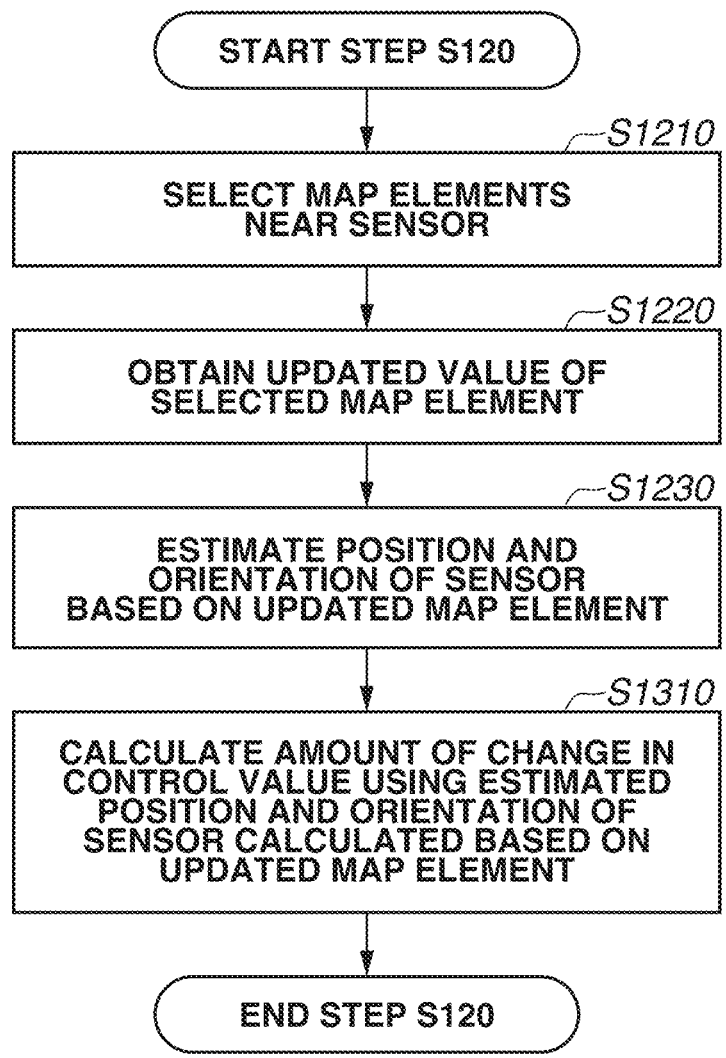
FIG. 6 is a flowchart illustrating details of processing.

FIG. 6 is a flowchart illustrating details of the processing performed by the difference obtaining unit 120 according to the present fourth exemplary embodiment. Steps S1210 to S1230 are similar to those of the processing procedure described in the third exemplary embodiment. A difference from the third exemplary embodiment is that the control values after a map update and the amounts of change in the control values before and after the map update are further calculated in step S1310 based on the position and orientation of the sensor 10 calculated after the map update in step S1230. In the present exemplary embodiment, the control values refer to the numbers of rotations of two drive wheels, the left and right wheels. The amounts of change in the control values refer to differences in the numbers of rotations of the respective wheels before and after a map update.

In step S1310, the difference obtaining unit 120 calculates the amounts of change in the control values before and after a map update. First, the difference obtaining unit 120 calculates the control values based on the position and orientation of the sensor 10 after the map update, calculated by the difference obtaining unit 120 in step S1230. The control values are calculated by a DWA that reduces the Euclidean distance between the coordinates of the sensor 10 after the map update and a target position of the vehicle. In the present exemplary embodiment, the target position of the vehicle is input to the difference obtaining unit 120 by a not-illustrated input unit. Next, the difference obtaining unit 120 calculates differences between the calculated control values after the map update and the control values calculated by the control value determination unit 17. In the present exemplary embodiment, the control values refer to the numbers of rotations of the two drive wheels. The difference obtaining unit 120 calculates an average of the differences in the numbers of rotations of the two drive wheels before and after the map update as the difference.

In the fourth exemplary embodiment, the greater the amounts of change in the control values of the vehicle calculated before and after a map update, the greater the calculated difference. This reduces abrupt changes in the speed and direction of the vehicle.

In the fourth exemplary embodiment, the difference is the average of the differences in the numbers of rotations of the two drive wheels before and after a map update. However, any value may be used as long as the differences in the control values before and after a map update are reduced. If two drive wheels are used as in the present exemplary embodiment, the value of the greater one of the differences in the numbers of rotations before and after a map update may be used as the difference. Alternatively, the value of the smaller one of the differences may be used as the difference. A difference between the weighted numbers of rotations to which predetermined weights are added may be used as the difference. While the present exemplary embodiment describes the case where the control apparatus 11 controls the two drive wheels, the configuration of the control apparatus 11 is not limited as long as the greater difference can be calculated as the differences in the control values becomes greater due to a map update.

In the fourth exemplary embodiment, the control values are calculated by using the DWA. However, the DWA is not restrictive, and any method capable of calculating control values that can be compared before and after a map update may be used. A graph search approach that is a technique for calculating variations of control values not at a point in time but at a plurality of times in the future, calculating positions and orientations (predicted trajectory) at the plurality of times, and selecting control values for tracing the predicted trajectory may be used. Other techniques may also be used. Examples include a randomized approach for selecting a predicted trajectory generated by repeating sampling a certain obstacle-free region in a 2D space at random based on the current position and further sampling a nearby space at random with that point as a node.

In the fourth exemplary embodiment, the control values are directly calculated and compared. However, an amount of change in an element for calculating the control values may be used as the difference without calculating the control values. Specifically, such an amount of change refers to the amount of change in a relative target position. As employed herein, the amount of change in the relative target position refers to the Euclidean distance between the coordinates of the target position with respect to the position and orientation of the sensor 10 before a map update and the coordinates of the target position with respect to the position and orientation of the sensor 10 after the map update. The calculated Euclidean distance is used as the difference value. The Euclidean distance is not restrictive, and any applicable value may be used. Examples include a difference in the direction of the target position seen from the sensor 10 before and after a map update and the norm of a difference vector between two target positions.

In the first to fourth exemplary embodiments, the difference is calculated based on an internal state of the information processing system 100, such as a change in the position and orientation of the sensor 10 or the control values of the vehicle due to a map update. In a fifth exemplary embodiment, the difference is calculated based on a situation around the vehicle. In the present exemplary embodiment, the situation around the vehicle refers to an arrangement of objects nearby. A method for implementing a configuration that does not update the map if the vehicle is close to an object, and updates the map if the vehicle is away from objects, will be described.

A diagram illustrating a configuration of an information processing apparatus according to the fifth exemplary embodiment is similar to FIG. 1, which illustrates the configuration of the information processing apparatus 1 described in the first exemplary embodiment. Thus, a diagram thereof will be omitted. A difference from the first exemplary embodiment lies in the processing content of the processing step where the difference obtaining unit 120 calculates the difference. Similar to the first exemplary embodiment, the hardware configuration illustrated in FIG. 3 is used.

The overall processing procedure according to the fifth exemplary embodiment is similar to that of FIG. 2, which illustrates the processing procedure of the information processing apparatus 1 described in the first exemplary embodiment. Thus, a description thereof will be omitted. A difference from the first exemplary embodiment is that the difference obtaining unit 120, in step S120 (difference obtaining step), calculates the difference based on distance values between feature points and the sensor 10 as the situation around the vehicle.

In step S120, the difference obtaining unit 120 calculates the Euclidean distances between the 3D positions of the feature points included in all the key frame information included in the map information stored in the map storage unit 14 and the position calculated by the position and orientation estimation unit 13. The difference obtaining unit 120 calculates the reciprocal of the minimum value of the calculated Euclidean distances as the difference.

In the fifth exemplary embodiment, the difference is calculated based on the surrounding situation, i.e., the distances from the objects nearby. The smaller the distances from the objects nearby, the greater the difference value. Consequently, the smaller the distances between the vehicle and the objects nearby are, the less abrupt changes in speed and direction are.

In the present exemplary embodiment, the surrounding situation refers to the arrangement of objects nearby, and the difference is calculated based on the distances between the sensor 10 and the feature points. However, any method that can measure the distances between the sensor 10 and the objects nearby can be used.

For example, if the sensor 10 includes a depth camera or a stereo camera capable of obtaining depth values, the depth values obtained by such a camera may be used as the distances from the objects nearby.

Alternatively, depth values obtained by using a convolutional neural network (CNN) trained to estimate a depth map (data structure storing depth values in the respective pixels of the image) from an input image may be used as the distances from the objects nearby.

If the sensor 10 is a LiDAR sensor, the distances from measurement points nearby may be used as the distances from the objects nearby.

If the vehicle is configured to include a distance sensor such as an infrared sensor and an ultrasonic sensor, measurement values of such a distance sensor may be used as the distances from the objects nearby.

Without a distance sensor mounted on the vehicle, the distances between the vehicle and the objects nearby may be measured by using a sensor mounted on an object other than the vehicle. Examples of such sensor include a surveillance camera and a proximity sensor. If a layout diagram of surroundings of the vehicle is stored in a not-illustrated storage unit, the distances from the objects nearby may be calculated based on the position and orientation of the sensor 10 calculated by the position and orientation estimation unit 13 and the layout diagram.

In the present exemplary embodiment, the difference is obtained by using the distances between the sensor 10 and the objects nearby. Since the vehicle occupies a certain volume in a space, a shape model of the vehicle may be stored, and the shortest distances from the surface of the vehicle to the objects may be used as the distance values according to the present exemplary embodiment. This allows more accurate measurement of the distances between the objects nearby and the vehicle, and the difference can be more accurately calculated. Thus, the vehicle can be stably operated with higher safety.

While the difference is calculated by using the reciprocal of the minimum distance of the distances between the sensor 10 and the feature points nearby, any setting method that reduces the difference value as the distance increases can be used. An arccotangent function may be used. An exponential function with the negative value of the distance value as the exponent may be used. A sigmoid function into which the distance value is substituted, multiplied by −1, and to which 1 is added may be used. While the difference is calculated by using the minimum distance of the distances between the sensor 10 and the feature points nearby, an average or median of the distances from feature points located within a predetermined distance from the sensor 10 may be used.

In the present exemplary embodiment, the difference is calculated based on the distances from objects. However, attributes of the objects may be used as the surrounding situation. If a camera is used as the sensor 10, a CNN trained in advance to determine the type of object from a video image captured by the camera can be used to detect objects, and calculate the difference based on the types and the number of objects. For example, if there is a person or another vehicle nearby, the difference may be increased. Increasing the difference reduces the risk of the vehicle abruptly changing its direction or position due to a map update. The more people or other vehicles there are, the greater the difference may be made. The difference may also be increased near a door or a staircase. Fragile objects may be recognized to increase the difference. The difference may be increased as the weights of the objects nearby increase. In some applications, the greater difference may conversely be calculated as the weights become smaller. The difference may be increased as the moving speeds of the objects nearby increase. Any measurement method that can measure the moving speeds of the objects nearby can be used. Changes in the positions of moving objects nearby may be measured from a time series of images. If a moving object nearby is another vehicle, the moving speed of another vehicle may be received from a not-illustrated vehicle management system.

The foregoing measures can make abrupt changes in the speed and direction of the vehicle due to a map update less likely to occur if there is a person, another vehicle, a door, a staircase, or an expensive object nearby, or when the speeds of moving objects nearby are high. Thus, the vehicle can be stably operated with higher safety.

The difference obtaining unit 120 may be configured to calculate the difference by using point information as the surrounding situation so that the difference increases at a point where abrupt changes in the speed and direction of the vehicle is not desirable. Specifically, for example, the difference may be increased at corners and intersections. If specific objects such as a door and an automated machine are registered in a map or on a traveling route, the difference may be increased at such points. The difference obtaining unit 120 may be configured to increase the difference on a narrow route. Moreover, based on the traveling route, the difference obtaining unit 120 may increase the difference if the vehicle is traveling on a route where another vehicle can travel nearby.

With regard to such point information, a region thereof can be detected based on the map or route information stored in the map storage unit 14. The point information may be input from a not-illustrated vehicle management system via the communication I/F H17.

The difference obtaining unit 120 may be configured to increase the difference if the sensor 10 is located in a specific setting area that is set by the user in advance from a not-illustrated input unit. Examples of the setting area include an intrusion detection area and a map update prohibited zone.

In the fifth exemplary embodiment, the difference is calculated based on the information about objects around the vehicle, i.e., the distances from the objects. In a sixth exemplary embodiment, the difference is calculated based on a status of the vehicle. As employed in the present exemplary embodiment, the status of the vehicle refers to the mass of the vehicle. The greater the mass of the vehicle, the higher the kinetic energy of an abrupt change in the speed and direction of the vehicle. A configuration for calculating the greater difference as the mass of the vehicle becomes greater in such a case will be described.

A diagram illustrating a configuration of an information processing apparatus according to the sixth exemplary embodiment is similar to FIG. 1, which illustrates the configuration of the information processing apparatus 1 described in the first exemplary embodiment. Thus, a diagram thereof will be omitted. A difference from the first exemplary embodiment lies in the processing step where the difference obtaining unit 120 calculates the difference. Similar to the first exemplary embodiment, the hardware configuration illustrated in FIG. 3 is used.

The overall processing procedure according to the sixth exemplary embodiment is similar to that of FIG. 2, which illustrates the processing procedure of the information processing apparatus 1 described in the first exemplary embodiment. Thus, a description thereof will be omitted. A difference from the first exemplary embodiment is that the difference obtaining unit 120, in step S120 (difference obtaining step), calculates the difference based on the status of the vehicle.

In step S120, the difference obtaining unit 120 obtains mass information about the vehicle, stored in a not-illustrated storage unit. In the present exemplary embodiment, the mass of the vehicle is used as the difference value.

In the sixth exemplary embodiment, the difference is increased as the status of the vehicle, i.e., the mass of the vehicle, increases. Consequently, the greater the mass of the vehicle is, the less abrupt changes in the speed and direction of the vehicle due to a map update are.

In the present exemplary embodiment, the difference is calculated based on the mass of the vehicle as the status of the vehicle. However, any method for calculating the greater difference as the kinetic energy or potential energy of the vehicle becomes higher can be used.

If the vehicle transports an object, the mass of the vehicle may include the mass of the object to be transported. A method for inputting the mass of the object to be transported is not limited in particular. The mass of the object to be transported may be obtained from a not-illustrated vehicle management system via the communication I/F H17, or input by the user from a not-illustrated GUI. The information processing apparatus 1 may be configured to input a measurement value of a not-illustrated weight measuring device mounted on the vehicle via the I/O unit H18.

Alternatively, the greater difference can be calculated as the moving speed or angular velocity of the vehicle becomes higher.

If the vehicle is an aerial vehicle such as a drone, the greater difference may be calculated as the altitude becomes higher.

The status of the vehicle may be determined based on priority or a degree of significance of the task of the vehicle. For example, operation information about the vehicle may be used as the status of the vehicle. Examples of the operation information include in motion, at rest, transporting a load, charging, and loading a load. Difference values based on the respective pieces of operation information are input by the user in advance using a not-illustrated input unit. This allows the map to be updated depending on the operation status of the vehicle. For example, a map update can be disabled while a load is transported, and a map update can be enabled when position measurement is not used, such as when the vehicle is at rest and when the vehicle is being charged with electricity.

The difference may be calculated based on an attribute of the vehicle as the status of the vehicle. For example, the difference obtaining unit 120 may calculate the higher difference as rigidity of the vehicle is higher. The difference obtaining unit 120 may be configured to calculate the higher difference as a braking distance of the vehicle is longer. The difference obtaining unit 120 may calculate the higher difference as a detection distance setting parameter of an obstacle sensor is smaller. A price of the vehicle itself may be used as the attribute of the vehicle.

The difference may be calculated based on an attribute of the object to be transported mounted on the vehicle as the status of the vehicle. For example, the difference obtaining unit 120 can obtain a price of the object to be transported from a not-illustrated vehicle management system, and calculate the greater difference as the price is higher. The difference obtaining unit 120 may calculate the greater difference as the degree of rigidity of the object to be transported is higher or as the weight is greater. The difference obtaining unit 120 may be configured to calculate the greater difference as the number of objects to be transported is greater. The difference obtaining unit 120 may be configured to calculate a greater difference if the objects to be transported are not stably stacked. Loads being stably stacked means that the loads are not much tilted. Whether the loads are stably stacked is determined by capturing an image of the loads with a not-illustrated camera and measuring a tilt of each load. In such a manner, abrupt changes in the speed and direction of the vehicle due to a map update can be reduced based on the attribute of the object(s) to be transported.

Moreover, the differences described in the first to sixth exemplary embodiments may be combined, and the difference obtaining unit 120 may calculate such a combined difference. The differences may be combined in any way as long as the combined difference increases as a change in the position and orientation of the sensor 10 or a change in the vehicle, or the control values of the vehicle, calculated before and after a map update increases. As described in the fifth and sixth exemplary embodiments, any method capable of reducing abrupt changes in the speed and direction of the vehicle due to a map update based on the status of the vehicle or the attribute of objects nearby can be used. Specifically, a weighted sum or a weighted product of various differences calculated by the methods described in the first to sixth exemplary embodiments may be used. Moreover, the methods of only some of the exemplary embodiments may be combined to calculate the combined difference. The update behavior determination unit 130 may determine the update behavior by using the combined difference. This allows a map update satisfying various conditions described in the first to sixth exemplary embodiments. Thus, the vehicle can be stably operated with higher safety.

The first to sixth exemplary embodiments are described to be applied to a vehicle. However, the exemplary embodiments can be applied to any configuration that can estimate a position and orientation based on a sensor and map information and update a map, and is not limited to a configuration that is mounted on a vehicle. A seventh exemplary embodiment deals with one of such application examples. An information processing apparatus according to the present exemplary embodiment is mounted on a device that implements mixed reality (MR), augmented reality (AR), or virtual reality (VR). Examples of the device include a head-mounted display (HMD), a smartphone, and a tablet. A configuration of the information processing apparatus that is mounted on such a device and used to calculate a presentation position of a computer graphics (CG) image will be described.

Figure 7:
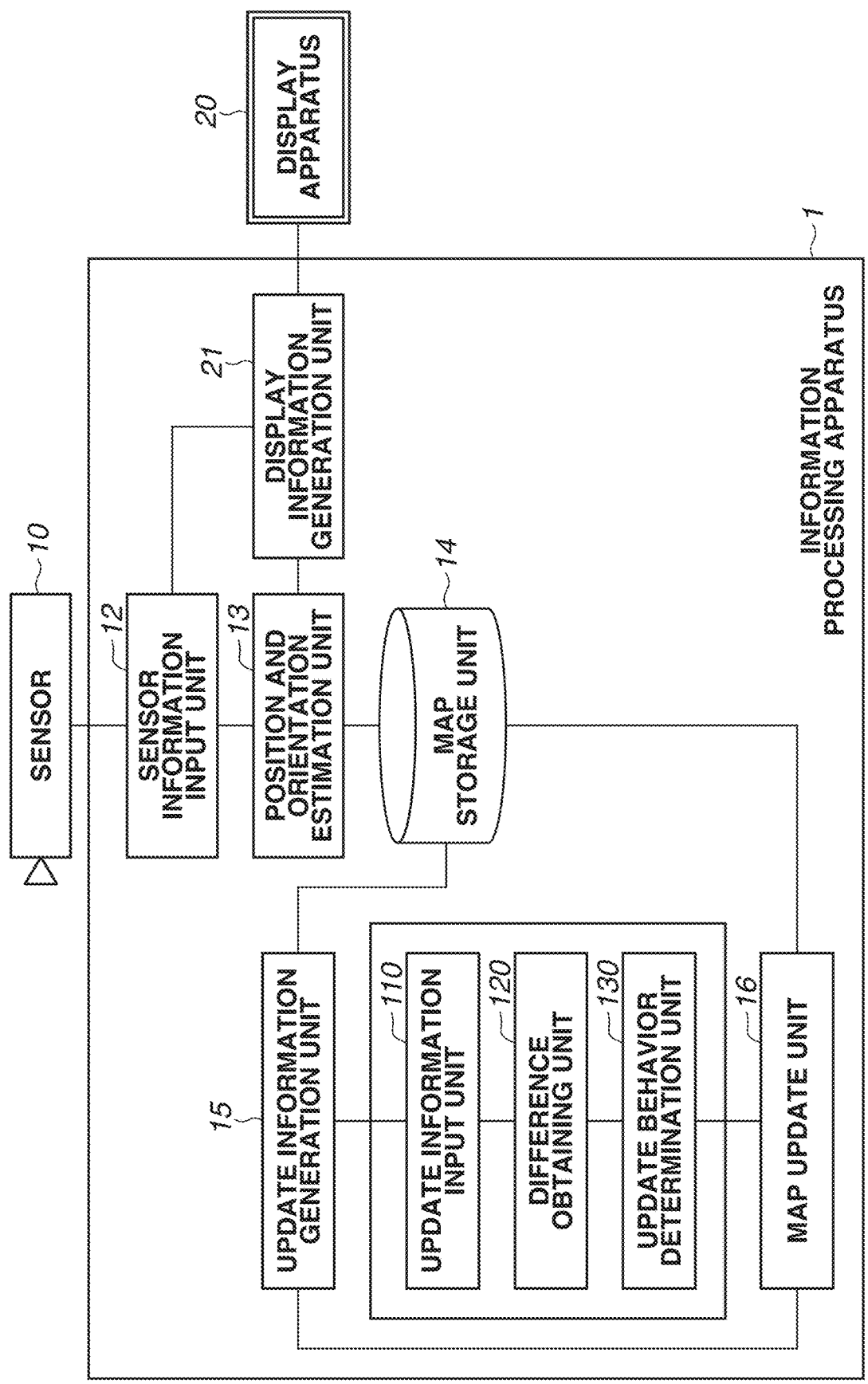
FIG. 7 is a block diagram illustrating a functional configuration example of an information processing apparatus.

FIG. 7 is a diagram illustrating a hardware configuration example where an information processing apparatus 1 according to the present exemplary embodiment is applied to an MR system. The information processing apparatus 1 includes a sensor 10, a display apparatus 20, a sensor information input unit 12, a position and orientation estimation unit 13, a map storage unit 14, an update information generation unit 15, a map update unit 16, and a display information generation unit 21. The information processing apparatus 1 further includes an update information input unit 110, a difference obtaining unit 120, and an update behavior determination unit 130.

The sensor 10, the sensor information input unit 12, the position and orientation estimation unit 13, the map storage unit 14, the update information generation unit 15, the map update unit 16, the update information input unit 110, the difference obtaining unit 120, and the update behavior determination unit 130 are similar to those described in the first exemplary embodiment. Thus, a description thereof will be omitted. A difference from the first exemplary embodiment is that the display apparatus 20 and the display information generation unit 21 are added.

The display information generation unit 21 renders a CG image of a virtual object by using the position and orientation input by the position and orientation estimation unit 13 and by using the camera's internal and external parameters stored in a not-illustrated storage unit. The display information generation unit 21 superimposes the CG image on an input image input by the sensor information input unit 12 to generate a combined image. The display information generation unit 21 outputs the combined image to the display apparatus 20.

The display apparatus 20 is a display of a mobile terminal. The display apparatus 20 displays the combined image generated by the display information generation unit 21.

A processing procedure according to the seventh exemplary embodiment is similar to the processing procedure of FIG. 2, which illustrates the processing procedure of the information processing apparatus 1 described in the first exemplary embodiment. Thus, a description thereof will be omitted. A difference from the first exemplary embodiment is that a display information generation step is performed instead of step S14 (control value determination step).

In the display information generation step, the display information generation unit 21 renders a CG image of a virtual object by using the position and orientation of the sensor 10 calculated by the position and orientation estimation unit 13 in step S13, and superimposes and combines the CG image on/with the input image to generate a combined image. The display information generation unit 21 inputs the combined image into the display apparatus 20 for presentation.

In the seventh exemplary embodiment, the map is updated so that the amount of change in the position and orientation calculated before and after a map update decreases. This reduces abrupt changes in the position and orientation due to a map update in the vicinity of a space where the user uses MR, AR, or VR. The CG image can thereby be presented with less CG image displacements or CG image dropouts so that the user is less likely to notice them. This can improve the user's MR, AR, or VR experience.

In the present exemplary embodiment, the difference is described to be calculated by the method described in the first exemplary embodiment. However, the difference according to the present exemplary embodiment can be calculated by any of the methods described in the first to sixth exemplary embodiments as long as abrupt changes in the position and orientation due to a map update decrease. Similar to the second exemplary embodiment, the amount of change in an update element may be used. Similar to the third exemplary embodiment, the difference may be calculated based on the amount of change in the position and orientation of the sensor 10 calculated before and after a map update. Unlike the fourth exemplary embodiment, no control value is calculated in the present exemplary embodiment. However, with the target position being rephrased as the presentation position of a CG image, the difference can be calculated to not change the position of the CG image. Similar to the fifth exemplary embodiment, the difference may be calculated based on the distances from objects nearby. Similar to the sixth exemplary embodiment, the difference may be calculated based on the status of the MR system, i.e., the moving speed of the MR system, whether the operation status is CG image presentation or not, and/or the weight of the MR system.

Moreover, the difference may be calculated based on an attribute such as the type and size of the CG contents. Specifically, the difference is calculated based on an attribute with which the user is more likely to notice a blur in the CG image. For example, the greater the size of the CG image, the greater difference may be calculated. The higher the contrast, the greater difference may be calculated. The closer to the center of the field of view the CG image is, the greater difference may be calculated. Furthermore, a not-illustrated eye tracking device may be included, and the difference value may be increased as eye movement decreases. Such a configuration can reduce the blur in the CG image perceptible to the user due to a map update, and the user can enjoy MR, AR, or VR experience more comfortably.

In the first to seventh exemplary embodiments, the update behavior of the map is determined based on the difference in the calculated position and orientation of the sensor 10 or the control values of the vehicle due to a map update. In an eighth exemplary embodiment, there will be described a method for controlling a vehicle in advance to avoid abrupt changes in the speed and direction of the vehicle due to a map update. Similar to the first exemplary embodiment, the hardware configuration illustrated in FIG. 3 is used. The hardware configuration illustrated in FIG. 3 may be mounted on the vehicle. The vehicle controls itself and updates the map by using measurements obtained by measuring the surroundings with a sensor. Alternatively, the hardware configuration example illustrated in FIG. 3 may be implemented in a host system controlling an entire plant or an intermediate system controlling the vehicle, without the hardware configuration being mounted on the vehicle. In such a case, the map information is updated by each vehicle and the system exchanging sensor information and the map information via communication I/Fs.

Figure 8:
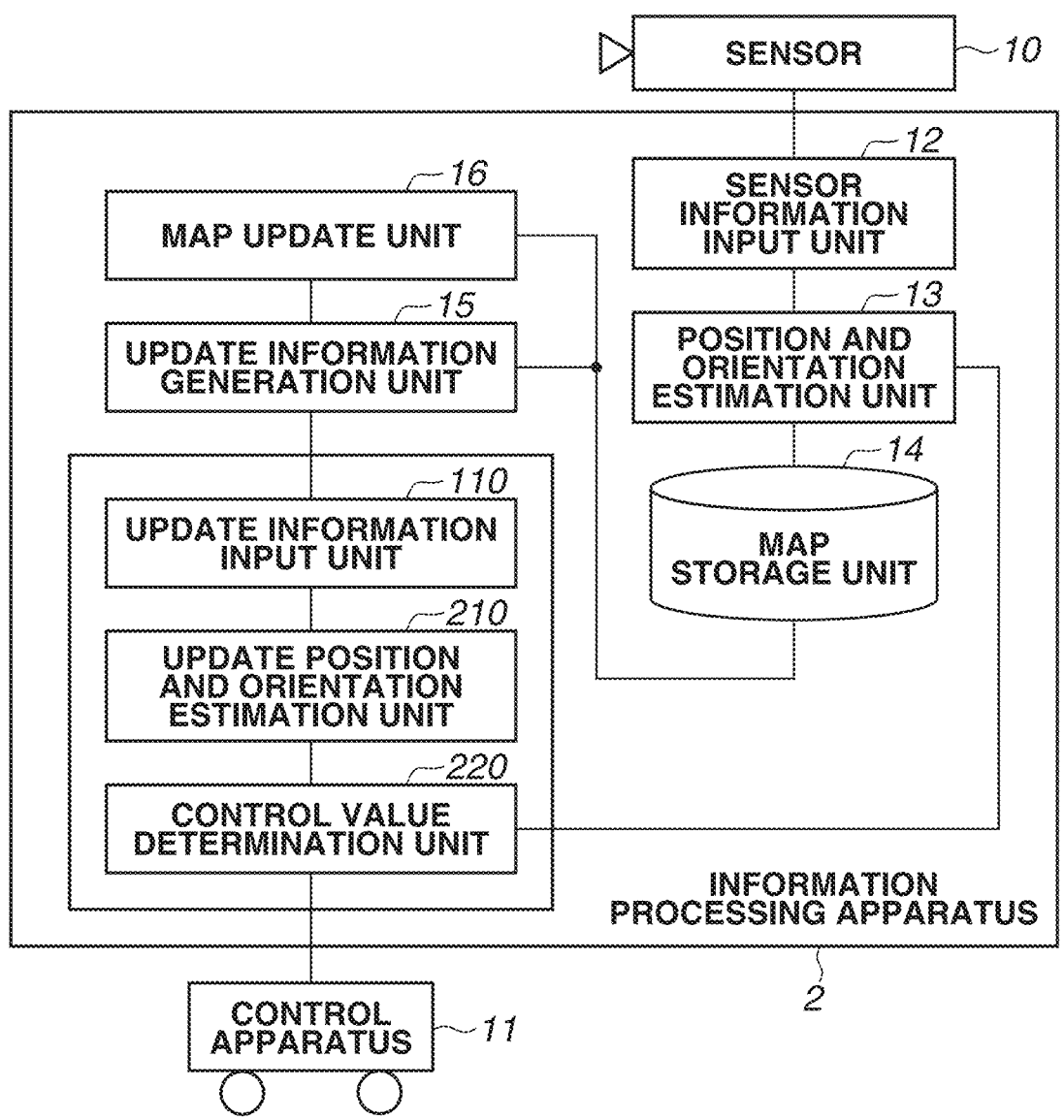
FIG. 8 is a block diagram illustrating a functional configuration example of an information processing apparatus.

FIG. 8 is a diagram illustrating a functional configuration example of an information processing apparatus 2 according to the present exemplary embodiment. An information processing system according to the present exemplary embodiment includes the information processing apparatus 2, a sensor 10, and a control apparatus 11. The information processing apparatus 2 includes a sensor information input unit 12, a position and orientation estimation unit 13, a map storage unit 14, an update information generation unit 15, and a map update unit 16. The information processing apparatus 2 further includes an update information input unit 110, an update position and orientation estimation unit 210, and a control value determination unit 220. Among these units, the sensor 10, the control apparatus 11, the sensor information input unit 12, the position and orientation estimation unit 13, the map storage unit 14, the update information generation unit 15, the map update unit 16, and the update information input unit 110 are similar to those of the first exemplary embodiment. Thus, a description thereof will be omitted.

A difference from the first exemplary embodiment is that the difference obtaining unit 120 is removed, and the update position and orientation estimation unit 210 and the control value determination unit 220 are newly added to the information processing apparatus 2.

The update position and orientation estimation unit 210 predicts the position and orientation of the sensor 10 to be calculated by the position and orientation estimation unit 13 after a map update based on the update information input by the update information input unit 110. Specifically, the update position and orientation estimation unit 210 estimates a predicted position and orientation (second position and orientation) of the vehicle estimated based on a new feature point obtained. The update position and orientation estimation unit 210 outputs the predicted position and orientation calculated to the control value determination unit 220.

Based on the predicted position and orientation calculated by the update position and orientation estimation unit 210, the control value determination unit 220 calculates control values so that a difference between the position and orientation calculated by the position and orientation estimation unit 13 and the predicted position and orientation decreases. The control value determination unit 220 outputs the calculated control values to the control apparatus 11.

Figure 9:
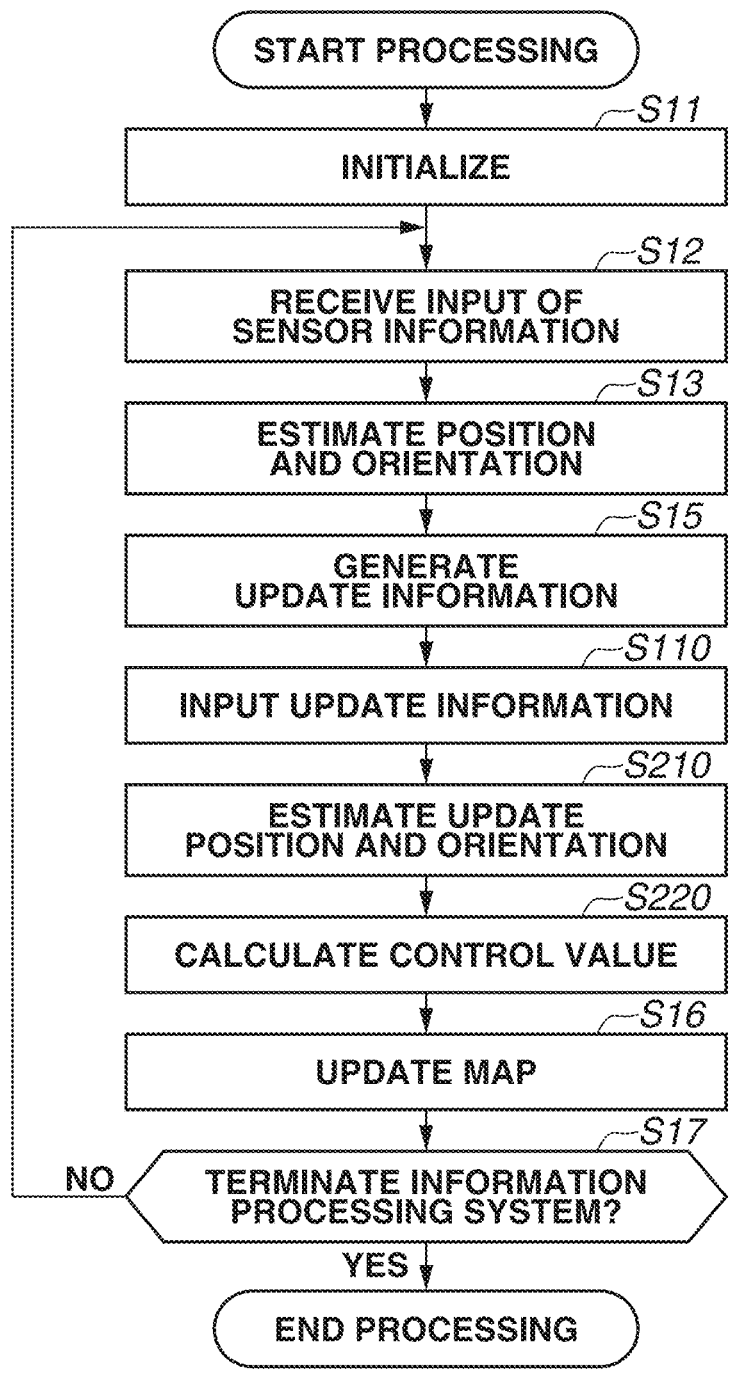
FIG. 9 is a flowchart illustrating a processing procedure performed by the information processing apparatus.
Figure 10A:
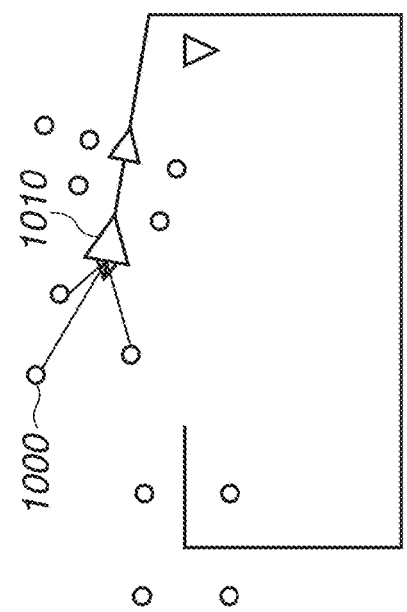
FIGS. 10A to 10D are diagrams illustrating examples of position estimation results of a vehicle before and after an update of a map.
Figure 10B:
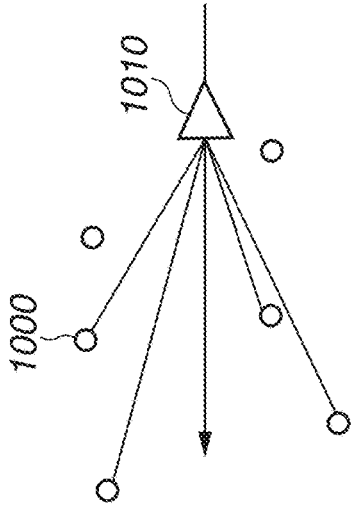
Figure 10C:
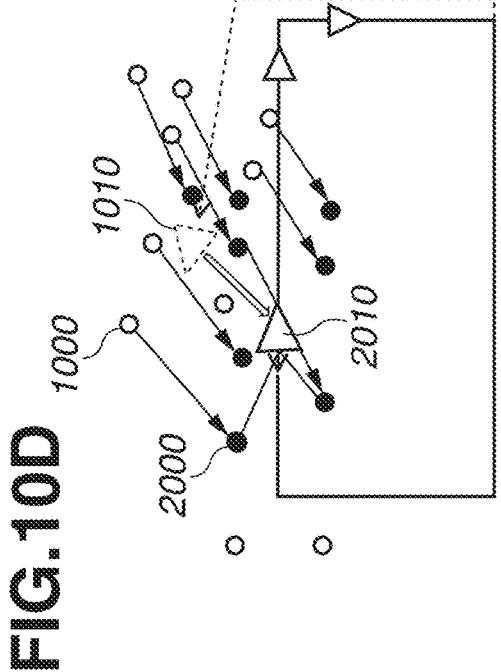
Figure 10D:
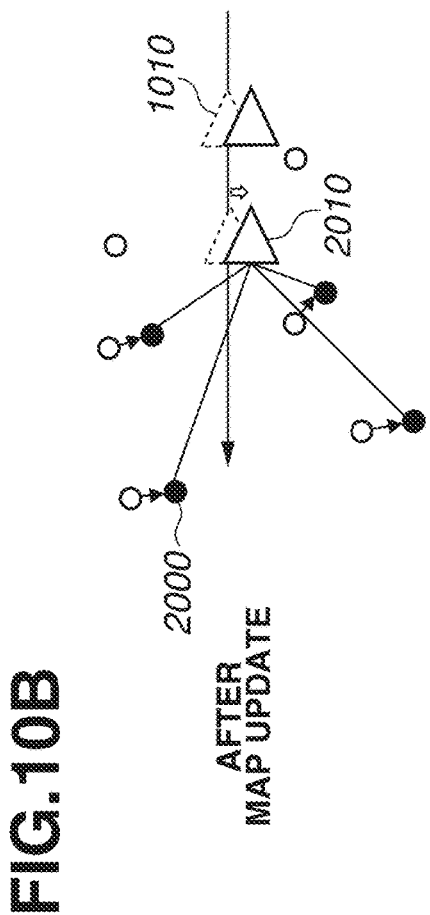

FIG. 9 is a flowchart illustrating a processing procedure performed by the information processing apparatus 2 according to the present exemplary embodiment. The processing procedure includes the following processing steps: an initialization step (step S11), a sensor information input step (step S12), a position and orientation estimation step (step S13), an update information generation step (step S15), a map update step (step S16), a termination determination step (step S17), an update information input step (step S110), an update position and orientation estimation step (step S210), and a control value determination step (step S220).

The initialization step (step S11), the sensor information input step (step S12), the position and orientation estimation step (step S13), the update information generation step (step S15), the map update step (step S16), the termination determination step (step S17), and the update information input step (step S110) are similar to those of the first exemplary embodiment. Thus, a description thereof will be omitted.

In step S210 (update position and orientation estimation step), the update position and orientation estimation unit 210 estimates the position and orientation to be calculated by the position and orientation estimation unit 13 after a map update as a predicted position and orientation based on the update information input by the update information input unit 110. Specifically, the update position and orientation estimation unit 210 selects a feature point located within a predetermined distance from the sensor 10 from the feature point information included in each piece of key frame update information included in the key frame group update information included in the update information, and determines a rigid transformation from the amounts of movement of the feature point before and after a map update. The rigid transformation refers to a transformation matrix for uniquely transforming 3D coordinates into different 3D coordinates. In the present exemplary embodiment, the rigid transformation is a 4×4 matrix. In such a configuration, the rigid transformation is determined to minimize the distance between the positions of the feature point before and after an update. The update position and orientation estimation unit 210 calculates the rigid transformation as the amount of change in the position and orientation of the sensor 10, and determines the predicted position and orientation by multiplying the position and orientation of the sensor 10 before a map update by the rigid transformation.

In step S220 (control value determination step), the control value determination unit 220 calculates control values for controlling the vehicle to the predicted position and orientation estimated by the update position and orientation estimation unit 210. Specifically, the control value determination unit 220 calculates the control values that reduce the Euclidean distance from the position and orientation of the sensor 10 calculated by the position and orientation estimation unit 13, with the predicted position and orientation as the target. In the present exemplary embodiment, the control values are calculated by the DWA.

In the eighth exemplary embodiment, the position and orientation of the sensor 10 to be calculated after a map update are predicted in advance based on a change in an element due to the map update, and control values for moving the vehicle in advance into the predicted position and orientation are calculated. This reduces abrupt changes in the speed and direction of the vehicle.

In the eighth exemplary embodiment, the position and orientation of the sensor 10 after a map update are predicted based on the amount of update of a map element near the input position and orientation. As a method for calculating the position and orientation of the sensor 10 after a map update, the position and orientation may be calculated by using the update value of the map element and the sensor information. Specifically, the update position and orientation estimation unit 210 can calculate the position and orientation of the sensor 10 after a map update by a similar method to that by which the position and orientation estimation unit 13 calculates a position and orientation, using an image and the key frame group update information included in the update information.

In the eighth exemplary embodiment, the control values are calculated so that the vehicle takes the predicted position and orientation estimated by the update position and orientation estimation unit 210. However, the method for calculating the control values is not limited thereto as long as abrupt changes in the speed and direction of the vehicle can be reduced. For example, to avoid abrupt changes in the moving direction of the vehicle, the control values may be calculated in advance so that only the orientation of the vehicle coincides with the predicted orientation. If the position and orientation are predicted to change in the traveling direction of the vehicle, control values for deceleration may be calculated in advance. On the other hand, if the position and orientation are predicted to change in the direction opposite to the traveling direction, control values for acceleration may be calculated in advance.

In the eighth exemplary embodiment, the control values are calculated to achieve the predicted position and orientation of the sensor 10 after a map update. However, predicted values of the control values due to a map update may be calculated instead of the predicted position and orientation of the sensor 10, and the control values may be calculated in advance to reduce differences between the control values before the map update and the predicted control values. Specifically, the control values are calculated as weighted averages of the control values calculated based on the predicted position and orientation of the sensor 10 after a map update and the current control values. This can reduce abrupt changes in the control values.

In the eighth exemplary embodiment, the control values are calculated so that the vehicle takes the position and orientation after a map update. In addition, the map update unit 16 may be configured to receive the progress of control from the vehicle, and wait without updating the map until the vehicle reaches the position and orientation after the map update. By thus updating the map after the control of the vehicle is completed and an effect of a change in the position and orientation due to the map update becomes small, the vehicle can be stably operated with higher safety.

In the eighth exemplary embodiment, the control values are calculated so that the vehicle takes the position and orientation after a map update. In addition, the control values can also be calculated based on the differences described in the first to sixth exemplary embodiments. In a ninth exemplary embodiment, there is described a configuration for calculating control values such that a vehicle exits a range where the difference due to a map update is greater than a predetermined value by using the difference described in the first exemplary embodiment.

An information processing apparatus according to the present exemplary embodiment has a configuration similar to that of the eighth exemplary embodiment. Thus, a description thereof will be omitted. Similar to the first exemplary embodiment, the hardware configuration illustrated in FIG. 3 is used. A difference from the eighth exemplary embodiment is that the control value determination unit 220 inputs the difference calculated by the difference obtaining unit 120 described in the first exemplary embodiment instead of the difference calculated by the update position and orientation estimation unit 210 described in the eighth exemplary embodiment. Another difference is that the control value determination unit 220 calculates control values for moving the vehicle to a point where the difference decreases. In addition, the difference obtaining unit 120 receives moving route information stored in a not-illustrated storage unit. The moving route information refers to a list of coordinates up to a target point.

The processing steps according to the present exemplary embodiment are similar to the processing steps described in the eighth exemplary embodiment illustrated in FIG. 9. Thus, a description thereof will be omitted. Differences from the eighth exemplary embodiment lie in that step S210 (update position and orientation estimation step) is replaced with step S120 (difference obtaining step) described in the first exemplary embodiment, and in the processing content of step S220 (control value determination step).

In step S220 (control value determination step) according to the present exemplary embodiment, the control value determination unit 220 calculates the control values of the vehicle with a position outside a map area where the difference calculated by the difference obtaining unit 120 in step S120 (difference obtaining step) is greater than a predetermined value as the target position. The target position outside the map area refers to a point where the vehicle, tracing the moving route information in order from the current position and orientation of the sensor 10, first reaches outside the map area. The control values for moving the vehicle to the target position are calculated by the DWA.

In the ninth exemplary embodiment, the vehicle is controlled to move out of the map area where the position and orientation of the sensor 10 or the control values of the vehicle, calculated based on the difference, change greatly due to a map update. This reduces abrupt changes in the speed and direction of the vehicle.

In the ninth exemplary embodiment, step S120 (difference obtaining step) can use any of the difference calculation methods according to the first to sixth exemplary embodiments.

The control value determination unit 220 may use any method as long as control values for reducing the difference can be calculated. Specific examples of such control values include control values that increase the distance from an update range, control values that move the vehicle to a point where the amount of change in a map component is small, and control values that move the vehicle to a point where the distances between the vehicle and objects nearby increase.

Any method may be used to search for the point where the difference decreases as the target position. The control value determination unit 220 may divide the map area of the vehicle into a grid, calculate differences in respective grid cells, and calculate a grid cell where the difference is the smallest as the target position. This allows a map update without much movement of the vehicle. Alternatively, the control value determination unit 220 may randomly select a target point on a moving route for the vehicle to travel, and reselect a target point until a point where the difference is smaller than a predetermined value is selected. This allows a map update when the vehicle reaches a predetermined target point, without changing the moving route of the vehicle.

In the ninth exemplary embodiment, the control values are calculated to move the vehicle to a point where the difference is smaller than a predetermined value. However, such a method is not restrictive, and any method can be used as long as control values that do not cause an abrupt change in the speed and direction of the vehicle due to a map update are calculated. For example, if the vehicle is located at a point where the difference is greater than a predetermined value, the control values may be calculated so that the maximum value of the amounts of change in the control values of the vehicle falls to or below a predetermined value. Control values for confining the speed or angular velocity of the vehicle to or below a predetermined value in advance may be calculated. Control values for temporarily stopping the vehicle may be calculated. Control values for increasing the distances from objects nearby may be calculated.

In the ninth exemplary embodiment, the control values are calculated to move the vehicle to a point where the difference is smaller than a predetermined value. Conversely, a point where the amount of change in a map element used for position and orientation estimation falls below a predetermined value may be determined from the difference, and the control values may be calculated to move the vehicle to the point.

Such a point can be calculated by any method. For example, the control value determination unit 220 may calculate a range measurable by the sensor 10 at a given point on the map, and calculate a point where the rate of feature points of which the amount of movement due to a map update is greater than a predetermined value falls below a predetermined level within the range. The control value determination unit 220 may calculate a point where the rate of key frames of which the amount of movement due to a map update is greater than a predetermined value falls below a predetermined level.

In the first exemplary embodiment, the amounts of change in the position measurement values due to an update can be reduced by allowing a map update when the sensor 10, i.e., the vehicle, is away from the update region. This can reduce abrupt changes in the speed and direction of the vehicle.

In the second exemplary embodiment, the update behavior of the map is calculated based on the amount of change in the update element. Specifically, the map is updated if a change in the update element of the map is less than or equal to a predetermined value. The map is not updated if the update behavior exceeds a predetermined value. With such a configuration, the amount of change in the position measurement value due to an update is prevented from reaching or exceeding a predetermined level. This reduces abrupt changes in the speed and direction of the vehicle.

In the third exemplary embodiment, the position and orientation of the sensor 10 are calculated by using the update elements in the map. The greater the amount of change in the position and orientation of the sensor 10 before and after an update, the greater the calculated difference. This reduces abrupt changes in the speed and direction of the vehicle.

In the fourth exemplary embodiment, the greater the amounts of change in the control values of the vehicle calculated before and after a map update, the greater the calculated difference. This reduces abrupt changes in the speed and direction of the vehicle.

In the fifth exemplary embodiment, the difference is calculated based on the surrounding situation, i.e., the distances from objects nearby. The smaller the distances from the objects nearby, the greater the difference value. Consequently, the smaller the distances between the vehicle and the objects nearby are, the less abrupt changes in speed and direction are.

In the sixth exemplary embodiment, the difference is increased as the status of the vehicle, i.e., the mass of the vehicle, increases. Consequently, the greater the mass of the vehicle is, the less abrupt changes in the speed and direction of the vehicle due to a map update are.

In the seventh exemplary embodiment, the map is updated so that the amount of change in the position and orientation calculated before and after a map update decreases. This reduces abrupt changes in the position and orientation due to a map update in the vicinity of a space where the user uses MR, AR, or VR. The CG image can thereby be presented with less CG image displacements or CG image dropouts so that the user is less likely to notice them. This can improve the user's MR, AR, or VR experience.

In the eighth exemplary embodiment, the position and orientation of the sensor 10 to be calculated after a map update are predicted in advance based on a change in an element due to the map update, and control values for moving the vehicle in advance into the predicted position and orientation are calculated. This reduces abrupt changes in the speed and direction of the vehicle.

In the ninth exemplary embodiment, the vehicle is controlled to move out of the map area where the position and orientation of the sensor 10 or the control values of the vehicle, calculated based on the difference, change greatly due to a map update. This reduces abrupt changes in the speed and direction of the vehicle.

The update information input unit 110 may have any configuration as long as update information about a map element is input. For example, if the map element is key frames or feature points, update values for the positions and orientations of the key frames or the 3D coordinates of the feature points may be input. A key frame refers to a minimum unit of map element for calculating the position and orientation of the sensor 10. A feature point is an index used for position and orientation estimation. If the map element is an occupancy grid map (a map having a data structure in which passable areas and impassable areas such as walls are plotted on a grid), update values for the values stored in the grid cells may be input.

The difference obtaining unit 120 may have any configuration as long as the greater value is calculated, as the difference, as the amount of change in the position and orientation of the sensor 10 due to a map update becomes greater.

For example, the difference may be calculated based on the update region of the map. Specifically, the greater value may be calculated as the update region of the map is wider and the distance between the update region and the sensor 10 is closer. If the sensor 10 is located in the update region, a greater difference value may be calculated than if not.

The difference may be calculated based on the amount of change in the update element of the map. Specific examples include the amount of movement of a map element due to a map update and the rate of map elements of which the amount of change in the update element due to a map update is greater than a predetermined value among map elements used to calculate the position and orientation of the sensor 10.

The difference value is increased as the amount of change in the position and orientation of the sensor 10 calculated before and after a map update increases.

The difference may be calculated to be greater the greater the amount of change in the control values for controlling the vehicle due to a map update is.

The difference may be calculated based on the situation around the sensor 10. Specifically, the difference may be calculated to be greater the smaller the distances from objects nearby are. The difference may be calculated to increase as a specific situation nearby, such as types, sizes, the number, moving speeds, weights, and prices of objects nearby, increases.

The difference may be calculated based on the status of the vehicle on which the sensor 10 is mounted. Specifically, the difference may be calculated to be greater the greater the weight of the vehicle or an object mounted thereon is. Also, the difference may be calculated to be greater the lower the stacking stability of objects mounted is.

The update behavior determination unit 130 may have any configuration as long as the update behavior determination unit 130 calculates a value such that the map is less likely to be updated as the difference is greater. For example, the update behavior determination unit 130 may be configured so that a real number normalized to the range of 0 to 1 is used as the value of the update behavior, and the update behavior approaches 0 as the difference value decreases and approaches 1 as the difference value increases. Here, the difference value may be normalized by any method. Specifically, an arccotangent function of the difference value may be used. An exponential function with the negative value of the difference value as the exponent may be used. A sigmoid function into which the difference value is substituted, multiplied by −1, and to which 1 is added may be used.

The control value determination unit may use any calculation method that reduces a change in the position and orientation of the sensor 10 due to a map update or reduces a change in the control values due to a map update. For example, the control value determination unit may calculate control values for controlling the vehicle to the position and orientation after a map update. The control value determination unit may calculate control values so that the control values approach the control values to be calculated after a map update. The control value determination unit may calculate the control values so that the difference calculated by the difference obtaining unit 120 decreases.

A trained model generated by machine learning may be used to perform processing instead of the position and orientation estimation unit 13 and the update information generation unit 15 among the foregoing processing units. In such a case, for example, a plurality of combinations of input data and output data to/from the processing units is prepared as training data. The trained model that acquires knowledge from the training data by machine learning and that, based on the acquired knowledge, outputs output data corresponding to input data as a result is generated. The trained model can be configured as a neural network model, for example. The trained model performs the processing of the processing units by operating as a program for performing processing equivalent to the processing of the processing units, in cooperation with the CPU H11 or a graphics processing unit (GPU). The trained model may be updated as appropriate after certain processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-229709, filed Dec. 19, 2019, and Japanese Patent Application No. 2019-229710, filed Dec. 19, 2019, which are hereby incorporated by reference herein in their entirety.

What is claimed is:

1. An information processing apparatus comprising:
a processor and a memory configured to be in communication with each other and to perform operations including:
obtaining, in relation to a feature point included in map information stored in a map storage, a first position of the feature point and a second position of the feature point, wherein the first position of the feature point is obtained from the map information, and the second position of the feature point is obtained from sensor information obtained from a sensor mounted on a vehicle,
generating update information for updating the map information based on the obtained first position of the feature point and the obtained second position of the feature point, wherein the feature point is measured in an environment including a closed route for the vehicle to travel along,
restraining, in a case where a distance between a first position of the vehicle and a second position of the vehicle is greater than a distance threshold, an update of the map information, where the first position of the vehicle is estimated based on the first position of the feature point and the sensor information, and the second position of the vehicle is estimated based on the second position of the feature point,
updating, in a case where the vehicle continues traveling along the closed route, the map information between when the vehicle gets a predetermined distance or more away from the first position of the vehicle and when the vehicle returns to a predetermined distance or less away from the second position of the vehicle,
estimating position and orientation of the vehicle based on the sensor information and the updated map information, and
controlling a movement of the vehicle based on the estimated position and orientation of the vehicle,
wherein, in the case where the distance between the first position of the vehicle and the second position of the vehicle is greater than the distance threshold, updating includes updating the map information by an amount indicated by the update information through a plurality of update operations, wherein each of the plurality of update operations updates the map information by a fraction of the amount indicated by the update information, wherein the first position of the vehicle is estimated based on the first position of the feature point and the sensor information, and wherein the second position of the vehicle is estimated based on the second position of the feature point.

2. The information processing apparatus according to claim 1,
wherein, in a case where the first position of the vehicle is not included in a region where the feature point included in the map information is measurable and the second position of the feature point is obtained based on the sensor information, updating includes updating the map information based on the second position of the feature point, and
wherein, in a case where the first position of the vehicle is included in the region where the feature point included in the map information is measurable and the second position of the feature point is obtained based on the sensor information, restraining includes restraining the update of the map information based on the second position of the feature point.

3. The information processing apparatus according to claim 1,
wherein the map information includes information about a position of a target point of the vehicle, and wherein, in a case where a magnitude of change between a first control value determined based on the first position of the vehicle and the position of the target point of the vehicle and a second control value determined based on the second position of the vehicle and the position of the target point of the vehicle is greater than a magnitude of change threshold, restraining includes restraining the update of the map information.

4. The information processing apparatus according to claim 1,
wherein, in a case where a magnitude of change between the first position of the vehicle and the second position of the vehicle is greater than a magnitude of change threshold, updating includes updating the map information over a plurality of times.

5. The information processing apparatus according to claim 1,
wherein obtaining further includes obtaining an update region including the feature point included in the map information, and
wherein, in a case where the first position of the vehicle is not included in the update region, updating includes updating the map information based on the obtained second position of the feature point.

6. The information processing apparatus according to claim 5, wherein, in a case where the first position of the vehicle is included in the update region, updating includes updating the map information when the vehicle is a predetermined distance away from the update region.

7. The information processing apparatus according to claim 1,
wherein obtaining further includes obtaining information indicating a distance between a surrounding object around the vehicle and the vehicle based on the sensor information,
wherein, in a case where the surrounding object is not present within a predetermined range from the vehicle based on the obtained information, updating includes updating the map information, and
wherein, in a case where the surrounding object is present within the predetermined range from the vehicle, restraining includes restraining the update of the map information.

8. The information processing apparatus according to claim 1,
wherein obtaining further includes obtaining information about a weight of a load stacked on the vehicle or a weight of the vehicle, and
wherein, in a case where the weight of the load or the weight of the vehicle is greater than a weight threshold, restraining includes restraining the update of the map information.

9. The information processing apparatus according to claim 1, wherein the sensor information is a measurement of a distance between the vehicle and a surrounding environment.

10. The information processing apparatus according to claim 1,
wherein the map information is information representing a position of the feature point in the environment with three-dimensional coordinates, and
wherein the operations further include (A) estimating a combined first position and orientation of the vehicle based on (i) a three-dimensional position of the feature point and (ii) the feature point obtained from the sensor information, and (B) estimating a combined second position and orientation of the vehicle based on (i) a three-dimensional position of the feature point obtained from the sensor information.

11. The information processing apparatus according to claim 1, wherein the operations further include presenting information indicating that the map information is being updated.

12. The information processing apparatus according to claim 1, wherein the sensor information is information indicating at least any one of the following: (i) a distance between the sensor mounted on the vehicle and a surrounding object, or (ii) a type, size, number, moving speed, weight, and price of the surrounding object.

13. The information processing apparatus according to claim 1, further comprising the map storage,
wherein the map storage is configured to store the map information and updating includes storing the updated map information into the map storage.

14. A method for an information processing apparatus, the method comprising:
obtaining, in relation to a feature point included in map information stored in a map storage, a first position of the feature point and a second position of the feature point, wherein the first position of the feature point is obtained from the map information, and the second position of the feature point is obtained from sensor information obtained from a sensor mounted on a vehicle;
generating update information for updating the map information based on the obtained first position of the feature point and the obtained second position of the feature point, wherein the feature point is measured in an environment including a closed route for the vehicle to travel along;
restraining, in a case where a distance between a first position of the vehicle and a second position of the vehicle is greater than a distance threshold, an update of the map information, where the first position of the vehicle is estimated based on the first position of the feature point and the sensor information, and the second position of the vehicle is estimated based on the second position of the feature point;
updating, in a case where the vehicle continues traveling along the closed route, the map information between when the vehicle gets a predetermined distance or more away from the first position of the vehicle and when the vehicle returns to a predetermined distance or less away from the second position of the vehicle;
estimating position and orientation of the vehicle based on the sensor information and the updated map information; and
controlling a movement of the vehicle based on the estimated position and orientation of the vehicle,
wherein, in the case where the distance between the first position of the vehicle and the second position of the vehicle is greater than the distance threshold, updating includes updating the map information by an amount indicated by the update information through a plurality of update operations, wherein each of the plurality of update operations updates the map information by a fraction of the amount indicated by the update information, wherein the first position of the vehicle is estimated based on the first position of the feature point and the sensor information, and wherein the second position of the vehicle is estimated based on the second position of the feature point.

15. A non-transitory computer-readable storage medium storing a program to cause a computer to perform a method for an information processing apparatus, the method comprising:

obtaining, in relation to a feature point included in map information stored in a map storage, a first position of the feature point and a second position of the feature point, wherein the first position of the feature point is obtained from the map information, and the second position of the feature point is obtained from sensor information obtained from a sensor mounted on a vehicle;

generating update information for updating the map information based on the obtained first position of the feature point and the obtained second position of the feature point, wherein the feature point is measured in an environment including a closed route for the vehicle to travel along;

restraining, in a case where a distance between a first position of the vehicle and a second position of the vehicle is greater than a distance threshold, an update of the map information, where the first position of the vehicle is estimated based on the first position of the feature point and the sensor information, and the second position of the vehicle is estimated based on the second position of the feature point;

updating, in a case where the vehicle continues traveling along the closed route, the map information between when the vehicle gets a predetermined distance or more away from the first position of the vehicle and when the vehicle returns to a predetermined distance or less away from the second position of the vehicle;

estimating position and orientation of the vehicle based on the sensor information and the updated map information; and controlling a movement of the vehicle based on the estimated position and orientation of the vehicle, wherein, in the case where the distance between the first position of the vehicle and the second position of the vehicle is greater than the distance threshold, updating includes updating the map information by an amount indicated by the update information through a plurality of update operations, wherein each of the plurality of update operations updates the map information by a fraction of the amount indicated by the update information, wherein the first position of the vehicle is estimated based on the first position of the feature point and the sensor information, and wherein the second position of the vehicle is estimated based on the second position of the feature point.

* * * * *